(12) United States Patent
Agurok et al.

(10) Patent No.: US 8,355,536 B2
(45) Date of Patent: Jan. 15, 2013

(54) PASSIVE ELECTRO-OPTICAL TRACKER

(75) Inventors: Ilya Agurok, Santa Clarita, CA (US); Waqidi Falicoff, Stevenson Ranch, CA (US); Roberto Alvarez, Glendale, CA (US)

(73) Assignee: Light Prescriptions Innovators LLC, Altadena, CA (US)

( * ) Notice: Subject to any disclaimer, the term of this patent is extended or adjusted under 35 U.S.C. 154(b) by 192 days.

(21) Appl. No.: 12/709,780

(22) Filed: Feb. 22, 2010

(65) Prior Publication Data

US 2010/0278387 A1 Nov. 4, 2010

Related U.S. Application Data

(60) Provisional application No. 61/208,700, filed on Feb. 25, 2009, provisional application No. 61/260,149, filed on Nov. 11, 2009.

(51) Int. Cl.
*G06K 9/00* (2006.01)

(52) U.S. Cl. ........ 382/103; 235/411; 250/330; 250/334; 250/348; 329/301; 348/274; 351/206; 367/129; 382/141; 382/274

(58) Field of Classification Search .................. None
See application file for complete search history.

(56) References Cited

U.S. PATENT DOCUMENTS

| | | | | |
|---|---|---|---|---|
| 2,594,317 A * | 4/1952 | Lancor, Jr. et al. | ......... | 89/41.07 |
| 3,010,024 A * | 11/1961 | Barnett et al. | ............... | 348/169 |
| 3,111,665 A * | 11/1963 | Werner et al. | ................. | 342/125 |
| 3,177,362 A * | 4/1965 | Kutzscher et al. | ........... | 250/348 |
| 3,191,035 A * | 6/1965 | Brumfield et al. | ........... | 250/334 |
| 3,242,485 A * | 3/1966 | Astheimer | ...................... | 342/53 |
| 3,341,782 A * | 9/1967 | Aemmer | ...................... | 329/301 |
| 3,527,880 A * | 9/1970 | Gordon | ........................... | 348/50 |
| 3,829,838 A * | 8/1974 | Lewis et al. | ................... | 345/419 |

(Continued)

FOREIGN PATENT DOCUMENTS

JP 08-075396 3/1996

(Continued)

OTHER PUBLICATIONS

Shree K. Nayar, Venkata Peri, *Folded Catadioptric Cameras*, 1999 IEEE Computer Society Conference on Computer Vision and Pattern Recognition, pp. 217-223.

(Continued)

*Primary Examiner* — Tsung-Yin Tsai
(74) *Attorney, Agent, or Firm* — Drinker Biddle & Reath LLP

(57) ABSTRACT

A passive electro-optical tracker uses a two-band IR intensity ratio to discriminate high-speed projectiles and obtain a speed estimate from their temperature, as well as determining the trajectory back to the source of fire. In an omnidirectional system a hemispheric imager with an MWIR spectrum splitter forms two CCD images of the environment. Three methods are given to determine the azimuth and range of a projectile, one for clear atmospheric conditions and two for nonhomogeneous atmospheric conditions. The first approach uses the relative intensity of the image of the projectile on the pixels of a CCD camera to determine the azimuthal angle of trajectory with respect to the ground, and its range. The second calculates this angle using a different algorithm. The third uses a least squares optimization over multiple frames based on a triangle representation of the smeared image to yield a real-time trajectory estimate.

17 Claims, 17 Drawing Sheets

U.S. PATENT DOCUMENTS

| | | | | |
|---|---|---|---|---|
| 4,094,225 A * | 6/1978 | Greenwood | | 89/41.06 |
| 4,998,209 A * | 3/1991 | Vuichard et al. | | 382/274 |
| 5,034,986 A * | 7/1991 | Karmann et al. | | 382/103 |
| 5,150,426 A * | 9/1992 | Banh et al. | | 382/103 |
| 5,300,780 A * | 4/1994 | Denney et al. | | 250/342 |
| 5,379,088 A * | 1/1995 | Ueda et al. | | 396/49 |
| 5,500,904 A * | 3/1996 | Markandey et al. | | 382/103 |
| 5,578,784 A * | 11/1996 | Karr et al. | | 89/36.03 |
| 5,589,901 A * | 12/1996 | Means | | 396/12 |
| 5,596,509 A * | 1/1997 | Karr | | 235/411 |
| 5,631,654 A | 5/1997 | Karr | | 342/107 |
| 5,635,666 A * | 6/1997 | Bannasch et al. | | 102/334 |
| 5,699,797 A * | 12/1997 | Godik | | 600/475 |
| 5,781,505 A * | 7/1998 | Rowland | | 367/127 |
| 5,796,474 A * | 8/1998 | Squire et al. | | 356/152.1 |
| 5,912,862 A * | 6/1999 | Gustavsen et al. | | 367/129 |
| 5,980,254 A * | 11/1999 | Muehle et al. | | 434/11 |
| 5,992,292 A * | 11/1999 | Ennenga | | 89/41.22 |
| 6,690,011 B2 * | 2/2004 | Watanabe et al. | | 250/330 |
| 7,526,100 B1 * | 4/2009 | Hartman et al. | | 382/103 |
| 7,544,137 B2 * | 6/2009 | Richardson | | 473/415 |
| 7,620,232 B2 * | 11/2009 | Sakai et al. | | 382/141 |
| 7,965,868 B2 * | 6/2011 | Roberts et al. | | 382/103 |
| 2002/0107078 A1 * | 8/2002 | Collins | | 473/152 |
| 2003/0137593 A1 * | 7/2003 | Watanabe et al. | | 348/274 |
| 2004/0036838 A1 * | 2/2004 | Podoleanu et al. | | 351/206 |
| 2006/0283317 A1 * | 12/2006 | Melnychuk et al. | | 89/41.03 |
| 2007/0035617 A1 * | 2/2007 | Ko et al. | | 348/37 |
| 2007/0125951 A1 * | 6/2007 | Snider et al. | | 250/363.03 |
| 2008/0110994 A1 * | 5/2008 | Knowles et al. | | 235/462.42 |
| 2009/0039197 A1 * | 2/2009 | Maynard et al. | | 244/3.16 |
| 2009/0260511 A1 * | 10/2009 | Melnychuk et al. | | 89/1.11 |
| 2010/0027840 A1 | 2/2010 | Roberts et al. | | 382/103 |

FOREIGN PATENT DOCUMENTS

| | | |
|---|---|---|
| KR | 20-0240864 Y1 | 10/2001 |
| KR | 10-0663483 B1 | 1/2007 |

OTHER PUBLICATIONS

S. Snarski, K. Scheibner, S. Shaw, R. Roberts, A. LaRow, D. Oakley, J. Lupo, D. Neilsen, B. Jadge, J. Forren, "*Autonomous UAV-Based Mapping of Large-Scale Urban Firefights*" SPIE Defense and Security Symposium, vol. 6209, Mar. 24, 2006. pp. 1-12.

* cited by examiner

US 8,355,536 B2

PASSIVE ELECTRO-OPTICAL TRACKER

CROSS REFERENCE TO RELATED APPLICATIONS

This application claims benefit of and commonly owned U.S. Provisional Patent Applications No. 61/208,700 titled "Multiple Object Omnidirectional Passive Electro-Optical Tracker" filed Feb. 25, 2009 by Agurok and No. 61/260,149 titled "Passive Electro-Optical Tracker" filed Nov. 11, 2009 by Agurok. Both of those applications, which have at least one common inventor to the present application, are incorporated herein by reference in their entirety.

BACKGROUND OF THE INVENTION

Surveillance, detection, and tracking of multiple high-speed objects, particularly bullets, mortars, small rockets, and artillery shells, can help military forces immediately locate sources of enemy fire and trigger countermeasures, thereby reducing combat casualties.

The traditional techniques for detection and tracing of fast moving objects are different kinds of radar but unfortunately, traditional radar has inherently low resolution for such small objects. Worse yet, radar cannot scan 360° of azimuth with a high enough frequency (times per second) for timely bullet detection.

Fast moving projectiles rapidly heat up by several hundred degrees Kelvin, thereby radiating in the Mid-Infrared (MWIR) region, where electro-optical resolution is far superior, even to microwave radars. An MWIR system of the prior art was recently developed by Trex Enterprise Corp and is described in Ref. [1]. This technique comprises a high-resolution, "roving fovea" MWIR telescope for projectile tracking and a coordinated pulsed-laser radar (lidar) for distance determination. The rapidly slewing "roving fovea" method is quite fast by mechanical standards, but it still takes 200 msec for one scan of a field of regard of only 36° square and, therefore, five seconds are required for a full hemisphere. This means that bullets will not be detected and tracked to any useful extent. Moreover, the use of lidar on a precise targeting platform results in a system that is too bulky and expensive to purchase and not useful for tracking anything smaller than rockets and artillery shells.

One object of the present invention is to make possible a compact, cost-effective passive electro-optical tracker of multiple high-speed objects in a combat environment. The Passive Electro-Optical Munitions Tracker (PET) described in this specification can assist in providing pinpoint 3D information in real time to back-track projectiles to their source of fire.

SUMMARY OF THE INVENTION

Fast moving projectiles rapidly heat up by several hundred degrees Kelvin, thereby radiating in the Mid-Infrared (MWIR) region, where electro-optical resolution is far superior even to microwave radars.

The temperature of fast moving projectiles depends directly on their speed [1]. According to Wien's displacement law, the spectrum maximum of light emitted by a heated body shifts to shorter wavelengths as the temperature increases [4]. The atmosphere has two high transmission windows in the MWIR region, at wavelengths from 3.0 to 4.2 μm and from 4.3 to 5.2 μm. The temperature of an object can be estimated by comparing the irradiance measured by the sensor for that object for these two sub-wavebands. Once this value is determined the speed of the projectile can then be calculated. The instantaneous speed data and array of azimuth and elevation obtained from the electro-optical sensor, together with the calibrated signal levels in each of its pixels, can be used to determine the ballistic trajectory by a proprietary application of the least-square method. This approach can determine the 3D trajectory of projectiles with very high degree of accuracy using passive electro-optical sensors without the need for scanning lidar.

The imaging system can be a fixed staring array that monitors the entire target region for every image cycle. This staring array may use a "fish-eye" or similar lens or mirror arrangement to view 360° of azimuth using a CCD or other sensor array on a flat image plane. The projectile tracking optics can be compact as 60 mm in diameter and no more than 100 mm in length, and can be mounted on an army vehicle or unmanned aerial vehicle (UAV) to support troops with tactical battlefield information. This passive electro-optical tracker can have a short enough reaction time not only to back-track projectiles and pinpoint the source of the fire nearly in real time, but also to trigger alarms and automatic countermeasures. The system can also be tied into a battlefield database to help distinguish friendly versus enemy fire, which can also be used to both save lives and quickly rule out projectiles which are not emanating from hostile positions. The latter can reduce the computing power needed to track hostile projectiles.

One objective of the present invention is to make possible a system reaction time short enough to backtrack projectiles and pinpoint the source of the fire to trigger automatic countermeasures, such as laser designation or even counter-sniper fire, before a second enemy shot can be fired. Also, an audible warning to troops in the target zone could allow a second or two of time to simply duck.

BRIEF DESCRIPTION OF THE DRAWINGS

The above and other aspects, features, and advantages of the present invention will be more apparent from the following more particular description thereof, presented in conjunction with the following drawings wherein.

DETAILED DESCRIPTION OF THE PREFERRED EMBODIMENTS

A better understanding of various features and advantages of the present methods and devices may be obtained by reference to the following detailed description of the invention and accompanying drawings, which set forth illustrative embodiments. Although these drawings depict embodiments of the contemplated methods and devices, they should not be construed as foreclosing alternative or equivalent embodiments apparent to those of ordinary skill in the subject art.

1. Principles of Operation 1.1 Aerodynamics of Fast Moving Projectiles; Speed-Temperature Dependence.

Figure 1:
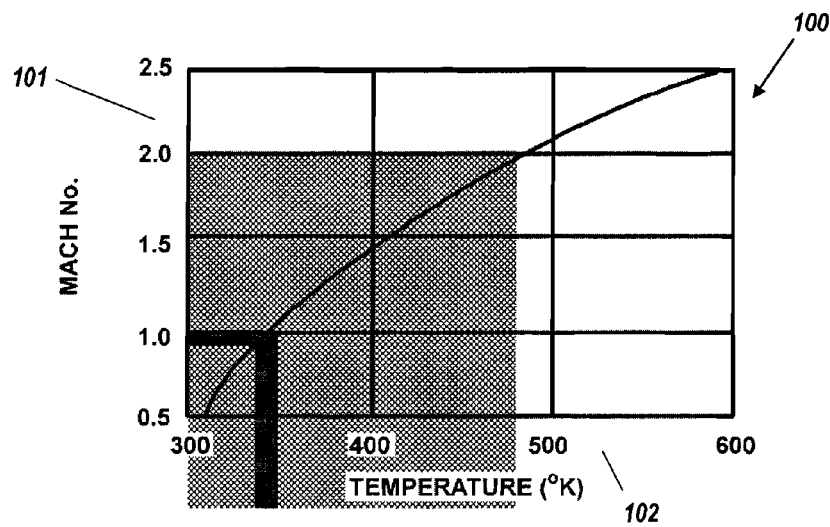
FIG. 1 is a graph of bullet speed as a function of temperature.

The surface of fast-moving bullets and other projectiles is quickly heated by air friction to a speed-dependent temperature, as detailed in Ref [1]. FIG. 1 shows a graph 100 with an ordinate 101 of projectile speed in Mach numbers (relative to Mach 1=340.3 m/s) and an abscissa 102 of absolute temperature. High speed IR imaging of an example of a bullet from a rifle reveals that it is traveling with a speed of 840 m/s (Mach 2.5) at a distance of 1 meter from the rifle. Aerodynamic frictional heating of the bullet's nose at this distance reaches a temperature of 440° K [3]. By the time the bullet has reached 2 m into its flight, it will reach a temperature of 600° K, the maximum temperature associated with a bullet speed of Mach 2.5, as can be seen in FIG. 1. Therefore by 2 meters from the muzzle of the rifle the "signature" of such a rifle and bullet can be fully determined.

1.2 Infrared Signature of Hot Objects.

Heated up projectiles radiate light and have their spectral maxima in or near the MWIR region. A very useful fact is that projectiles heated up to different temperatures have a different ratio between the IR energies radiated in the 4.3 to 5.2 microns transmission band, referred to in this specification as wavelength Band1, and in the 3.0 to 4.2 microns transmission band, referred to in this specification as wavelength Band2. By finding the ratio between the energies in the two bands, Band1 and Band2, the absolute temperature can be determined with good accuracy [2]. Once the absolute temperature is known, the speed can then be calculated with a high degree of confidence. Because only a ratio of two radiations is needed, the temperature, and therefore the speed, can be determined without needing to know the absolute radiation intensity, and therefore before determining the type, size, or distance of the target projectile.

The monochromatic intensity from a black body is given by the following equation from Planck's law [4]

$$u(v, T) = \frac{2hv^3}{c^2} \cdot \frac{1}{e^{\frac{hv}{k_B T}} - 1} \quad (1)$$

where u is thermal radiation intensity as a function of light frequency v and absolute temperature T. The physical constants in equation 1 are listed in Table 1. The total emissive power within a particular bandwidth is calculated by integrating equation 1 over the frequency interval of the bandwidth using the above equation from Planck or the modified Planck equation that gives the monochromatic intensity as a function of wavelength [4].

TABLE 1

| | Physical constants | |
|---|---|---|
| h | Planck's constant | 6.626 0693(11) × $10^{-34}$ J s = 4.135 66743(35) × $10^{-15}$ eV s |
| b | Wien's displacement constant | 2.897 7985(51) × $10^{-3}$ m K |
| $k_B$ | Boltzmann constant | 1.380 3205(24) × $10^{-23}$ J $K^1$ = 8.617 343(15) × $10^{-5}$ eV $K^{-1}$ |
| σ | Stefan-Boltzmann constant | 5.670 400(40) × $10^{-8}$ W $m^{-2}$ $K^{-4}$ |
| c | Speed of light | 299,792,458 m $s^{-1}$ |

Figure 2:
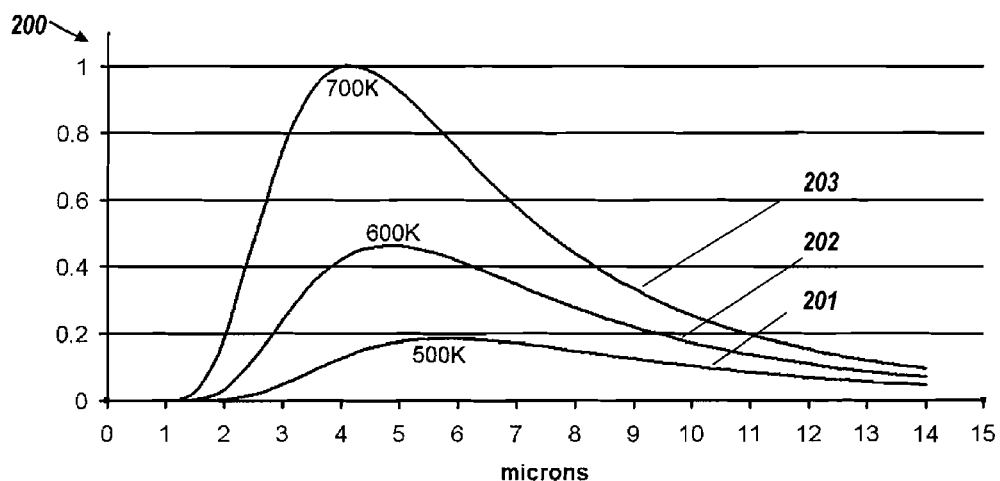
FIG. 2 is a graph of spectral radiant emittance of heated up gray bodies.

Projectiles are typically made of metals. Such objects radiate as a gray body [4]. A gray body's spectral radiation power is u' (v,T)=εu(v,T), where u(v,T) is the spectral radiation of a black body (see Equation 1), and ε is the emissivity of the metal body (which is typically slowly varying over temperature but is constant over all wavelengths for a particular temperature). For a gray body ε≦1. Integrating u' (v,T) over the two MWIR bands gives the ratios (as parameter C) shown in Table 2. FIG. 2 shows graphs 200 with functions u' (v,T) for several temperatures: graph 201 for 500° K, graph 202 for 600° K and graph 203 for 700° K. Because ε is independent of wavelength, it will not affect the value of the parameter C, and will therefore not impair the estimation of temperature.

TABLE 2

| Thermal Signature of Different Bullet Speeds | | | |
|---|---|---|---|
| Speed, m/s | T, ° K | $\lambda_{peak}$, µm | C = Band1/Band2 |
| 700 | 511 | 5.67 | 1.68 |
| 800 | 570 | 5.08 | 1.4 |
| 900 | 628 | 4.61 | 1 |

Figure 3:
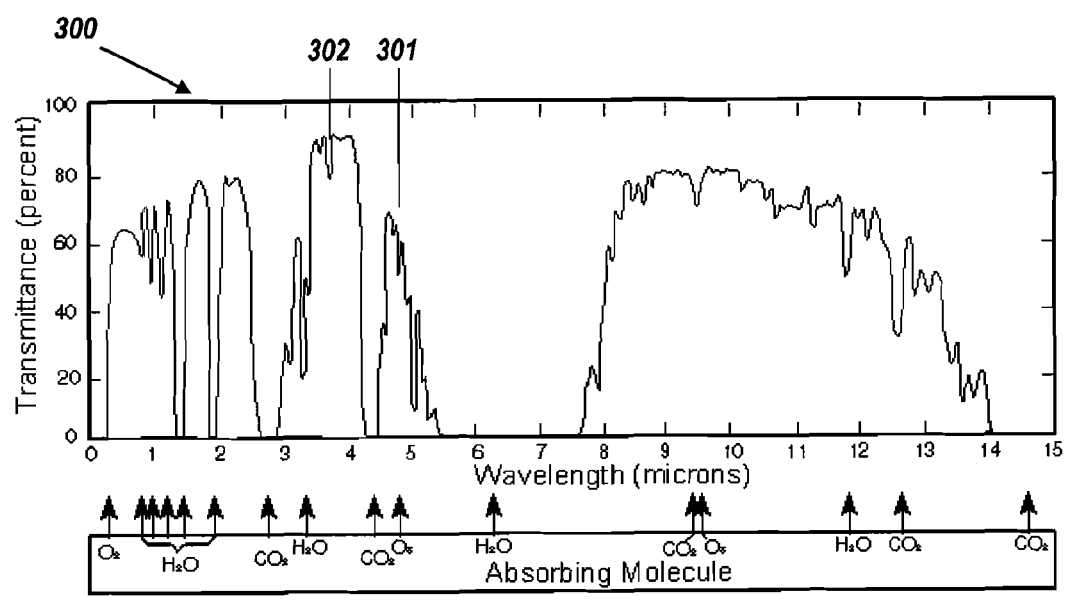
FIG. 3 is a graph of atmospheric spectral transmission.

FIG. 3 shows graph 300 of the infrared transmittance of air as a function of wavelength, with the two MWIR atmospheric transmission windows, Band1=4.3-5.3 µm, indicated at 301, and Band2=3.0-4.2 µm, indicated at 302, used in Table 2 calculations (for a 1800 m propagation distance at sea level).

1.3 Optical Tracker Architectures.

In an embodiment of the proposed system, a multilayer filter is used to split the two bands at 4.2 µm, so that light in one band is sent to one sensor and the other to a second sensor. An analysis shows that for this two band approach a 1% thermal and readout noise of the sensor results in 2% accuracy for the Band1/Band2 ratio, which in turn correlates to ±7° C. temperature accuracy.

Figure 4:
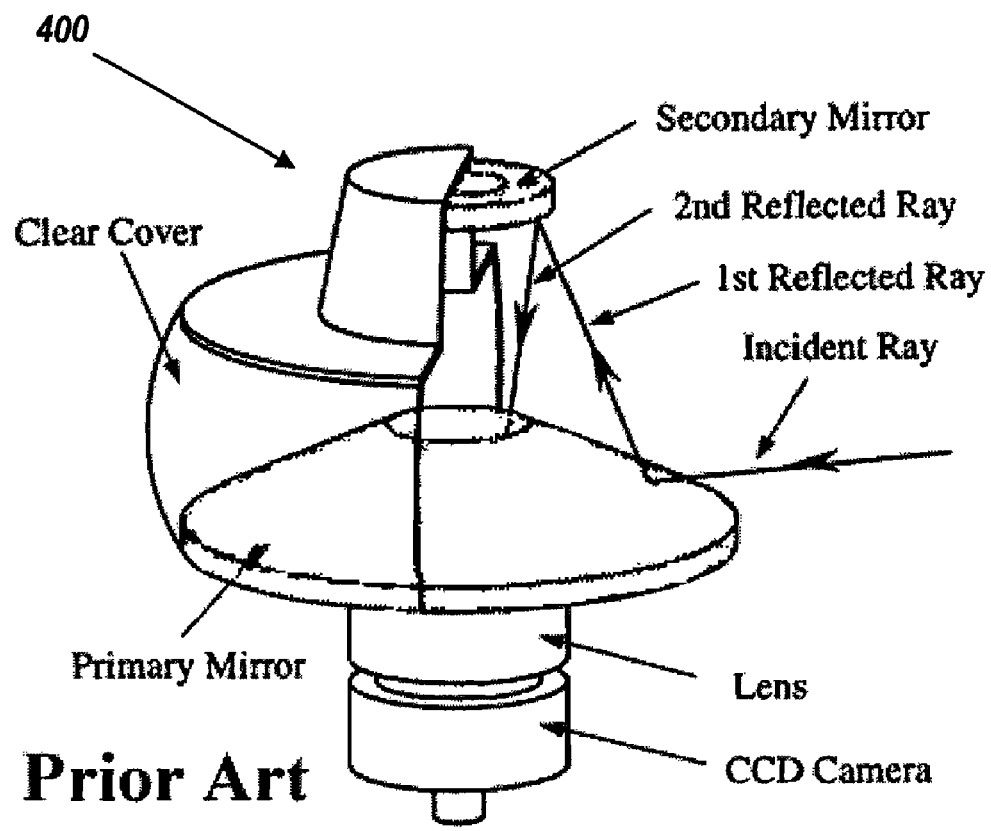
FIG. 4 is a perspective view of an omnidirectional two-mirror optic.

Several optical architectures can be used for omni-directional optics of the system. FIG. 4 shows the 3D view of a prior art embodiment of an omnidirectional optical system 400 of Ref. [5]. This sort of two mirror configuration is suitable in a ground mounted electro-optical tracker, where the blind spot directly upwards, caused by the secondary mirror, may be acceptable.

Figure 5:
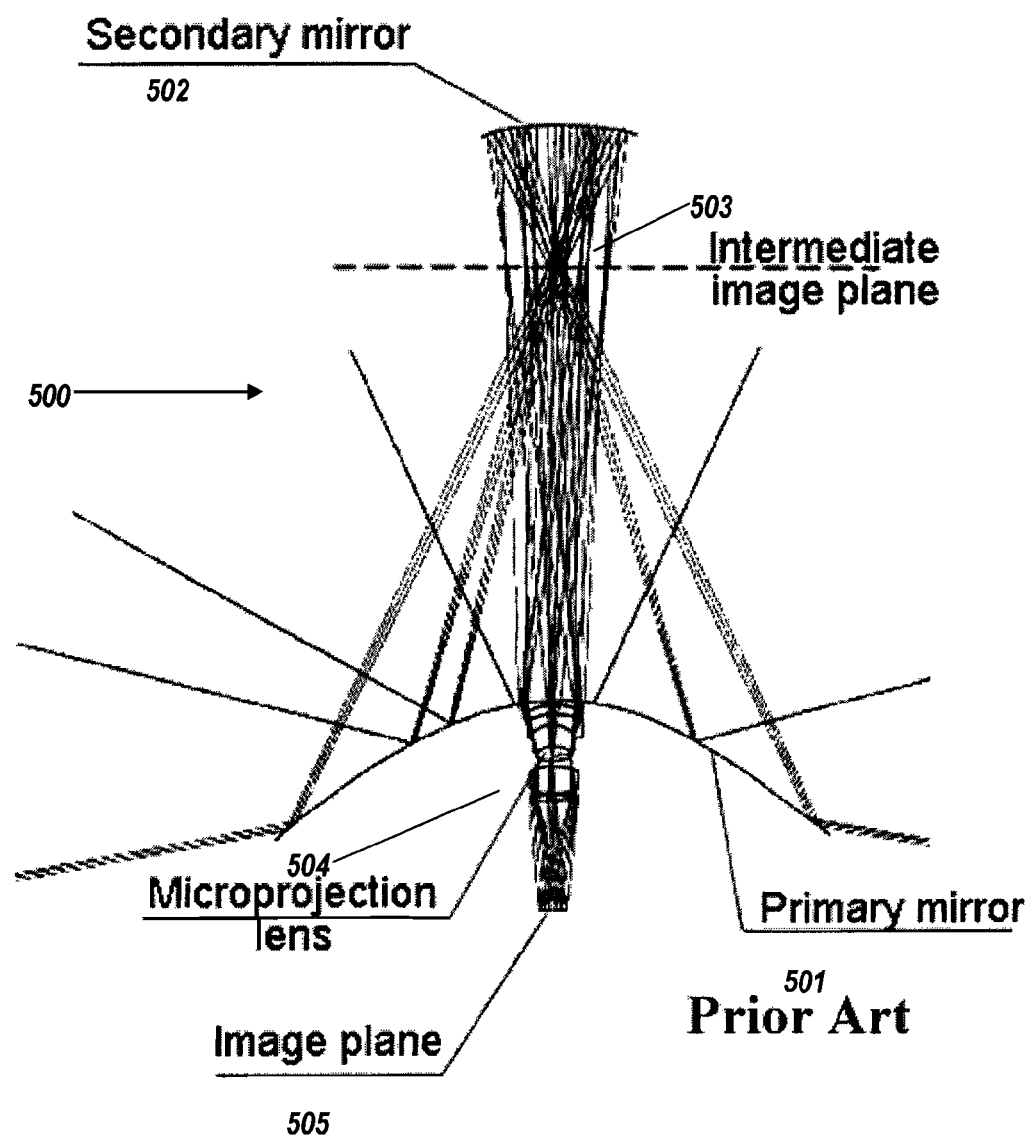
FIG. 5 is an axial sectional view of another, similar two-mirror optic.

FIG. 5 shows a plan view of a further development using a two-mirror panoramic system 500 according to U.S. Pat. No. 6,611,282 [6].

Figure 6:
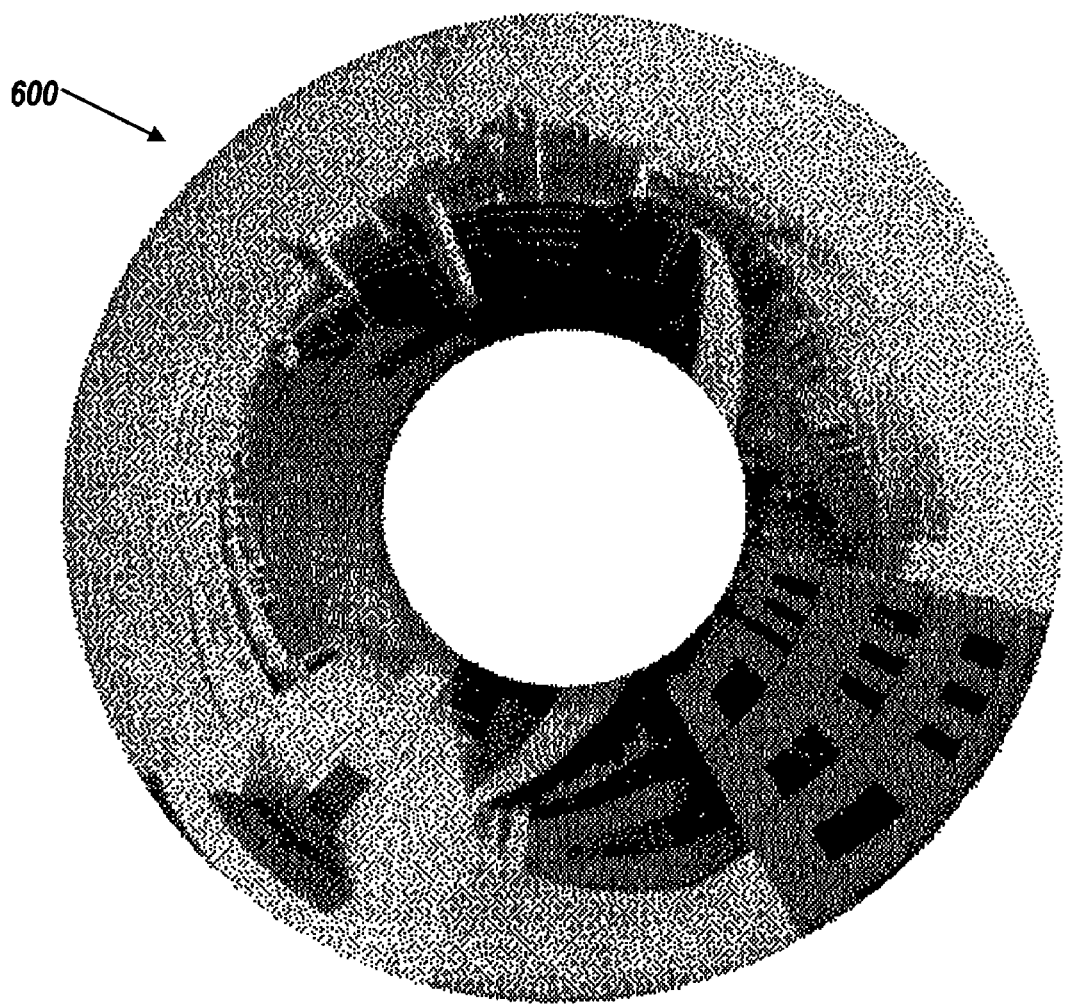
FIG. 6 shows an example of the annular format of an image from an omnidirectional optic similar to those of FIG. 4.
Figure 13:
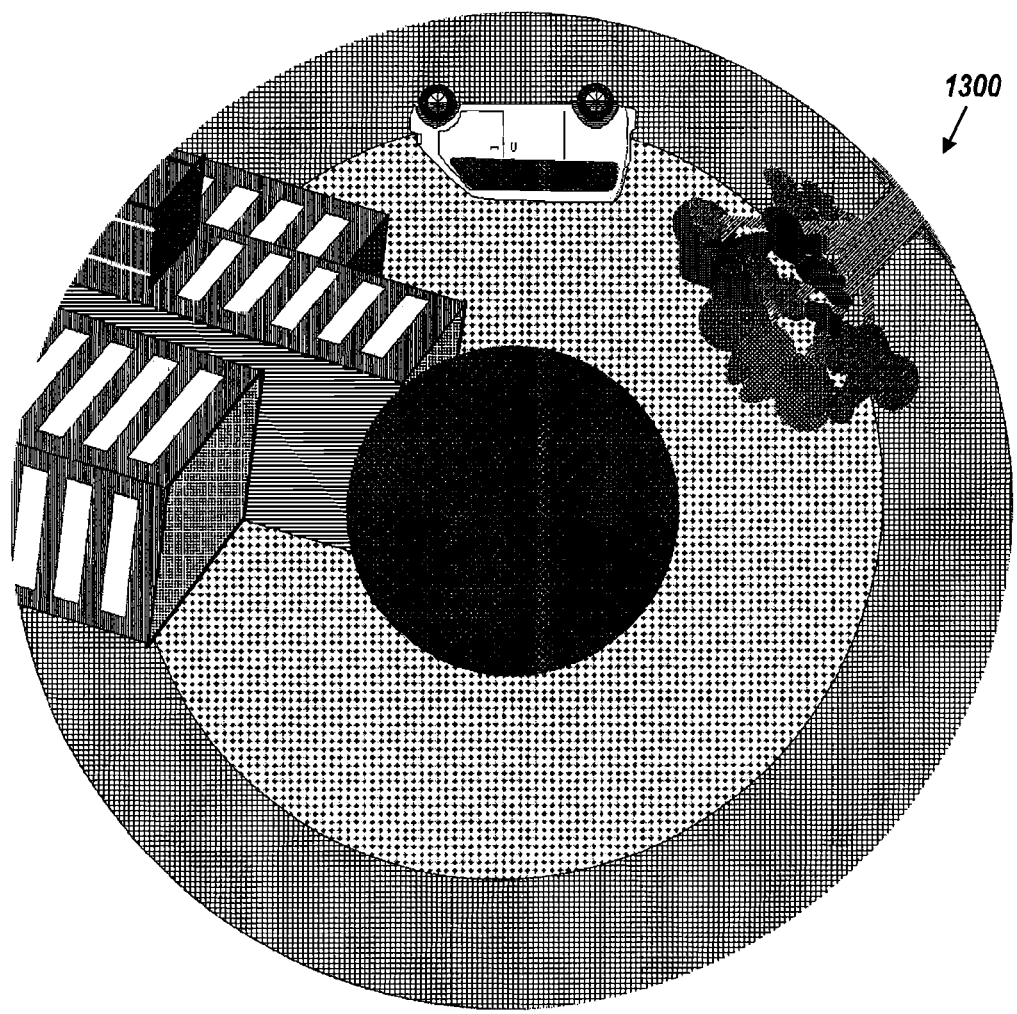
FIG. 13 is an image of the urban scene of FIG. 12 as projected onto a flat optical plane by an omnidirectional optic.

FIG. 6 shows example of an annular field of view, 601, that would be seen by a sensor, which is 360° in azimuth and −20° to +80° degrees in elevation. This is typical of the image obtained using the optical systems of FIG. 4. The Azimuth is mapped directly onto the image, and the elevation is mapped directly to a radius within the annulus. FIG. 6 shows the image with the highest elevation at the largest radius. Depending on the optical geometry, the image may instead have the highest elevation at the smallest radius, as illustrated in FIG. 13 below. The skilled optical designer will also understand how to control the relationship between altitude in the field of view and radius in the image plane.

Figure 7:
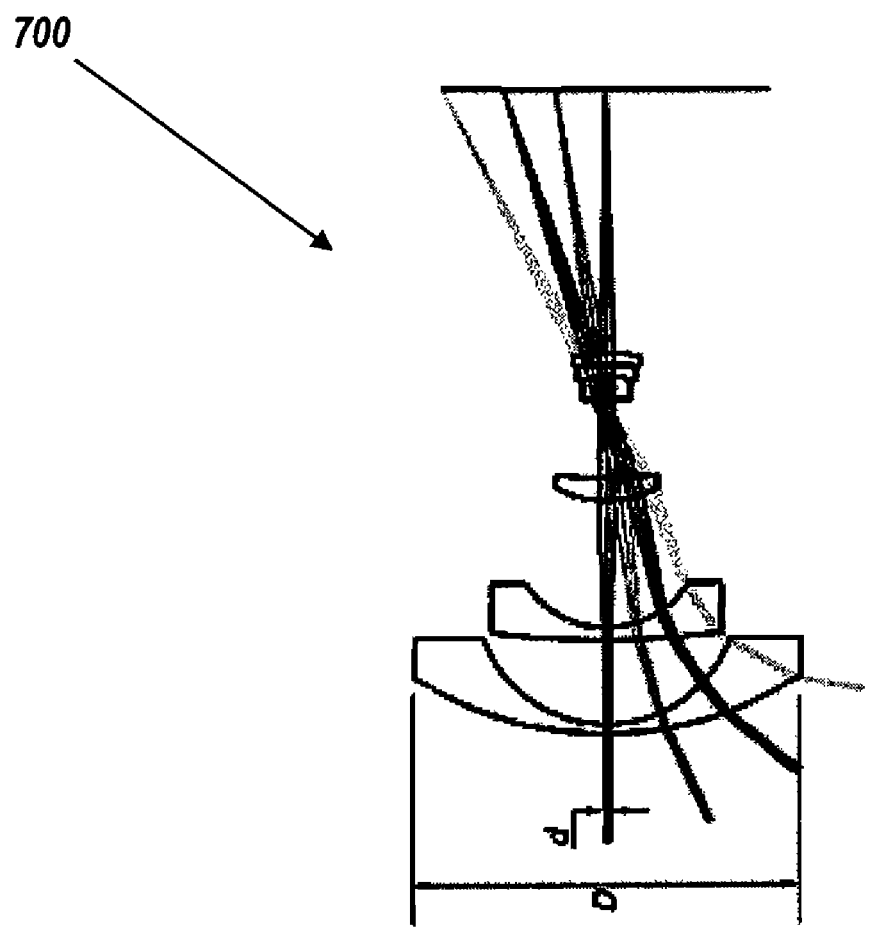
FIG. 7 is an axial sectional view of an omnidirectional fish-eye lens optic.

For UAV mounted systems the Fish-eye imager with hemispherical field of view, as shown FIG. 7 and indicated by the reference number 701, is preferable. As may be seen from FIG. 7, the fish-eye lens naturally produces an image with the center of the field of view at the center of the image, but the relationship between elevation (relative to the optical axis) and radius on the image is still to a significant extent controllable by the optical designer.

In the proposed system, the omni-directional optics, exemplified by FIG. 4, FIG. 5, or FIG. 7, is augmented with a spectrum splitting mirror (see FIG. 10) that enables two boresighted CCD images to be formed. A system controller collects and concurrently analyzes both streams of high-speed video data. By the next readout cycle there will be a temperature map highlighting objects of interest. Within a few more readout cycles, a complete 3D trajectory can be modeled, and the impact point and shooter position predicted. Also, once the range from the observing system to the projectile object is known, the absolute intensities of the original infrared images give an indication of the object's surface area, and hence bullet caliber, as well as providing a means of quickly calculating the planar trajectory angle that the bullet is traveling on (see angle β in FIG. 8)

In the case of multiple snipers firing in concert, there are the well-proven Kalman filtering algorithms utilized for strategic missile defense against even hundreds of projectiles. Kalman filtering is thus well suited for 'connecting the dots' for dozens of bullets at once, while simultaneously registering other items of military interest, particularly muzzle flashes, fires, detonations, and rocket exhaust, which could be tracked as well. Modern electronics have provided miniature field-deployable computers that can be adapted to such a video-computation load. Some of the early stages of pixel computation can be done integrally with the image readout.

FIG. 5 shows a possible type of hemispheric imaging with a two-mirror panoramic head. Primary mirror 501 is a convex hyperboloid and secondary mirror 502 is a concave ellipsoid. This pair transfers the omnidirectional input field into a flat internal ring shaped image 503 located between the mirrors. The beams are focused in this plane. A Double-Gauss projection lens 504 re-images this ring-shaped image onto receiver plane 505. It is necessary to perform this re-image, as the two-mirror optic produces a primary image in an intermediate plane located between the two mirrors. If the camera were positioned between the mirrors at the primary image plane location, the camera would obscure the incoming beams from the primary mirror to the secondary mirror. Given the practical constraints on the mirrors, it would be difficult to obtain a primary image behind the primary mirror. In addition, the mirrors 501, 502 typically produce a primary image so severely distorted that using a projection optic 504 to reduce the distortion is highly desirable.

The projection lens and CCD camera, which are typically the most expensive and most fragile parts of the tracker head, are also much less vulnerable when they are positioned behind the primary mirror, and can be placed in an armored enclosure for additional protection. The exposed parts of the optics are two mirrors, which can be reflective surfaces deposited on massively constructed, and therefore relatively robust, substrates. A polycrystalline alumina dome mounted on the primary mirror housing supports the secondary mirror and provides environmental protection for the whole optical assembly. Double Gauss lens 504 is a well known universal type of objective. It can compensate for a wide variety of aberrations—spherical, coma, astigmatism, and field curvature. In such an inherently distorted image, the optical system should not introduce any un-wanted aberrations since it could potentially destroy important information. Therefore, the omnidirectional optic should have controlled distortion so that, for example, the radial (elevations) distortion can be removed at the post processing.

The lens material for refractive optical elements must have a high transmission for the MWIR band. A suitable material can be germanium, silicon, or ZnSe, among others. The beamsplitter can be located in the object space so as to separate the two sub bands by reflecting one to a second camera. The ratio of image irradiance on the sensors in the two MWIR bands will give a temperature map, so that a small pixel-cluster can be tentatively identified as a projectile target and assigned an expected projectile speed. This also determines the radius within which the same projectile is expected to show up for the next readout cycle.

1.4 Tracking Algorithms.

Figure 8:
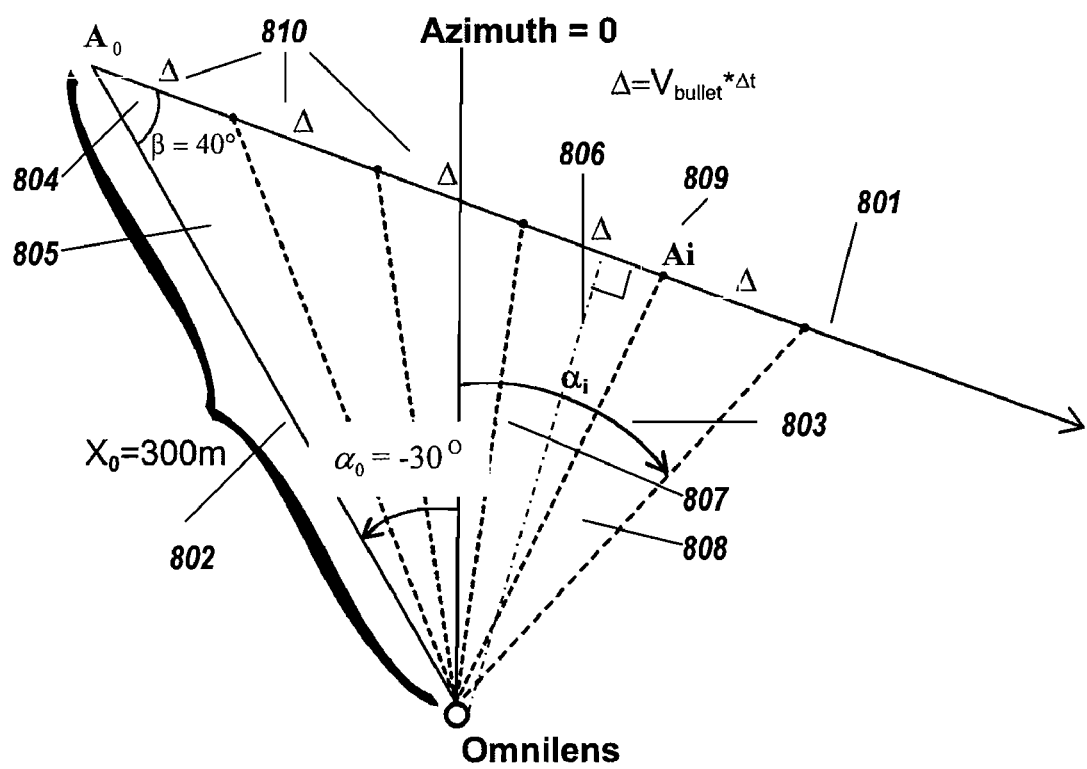
FIG. 8 is a diagram illustrating how range is calculated from successive observations of azimuth and speed.

A 2D example of the simulated trajectory of a bullet and its position over time is illustrated in FIG. 8. Table 3, which follows, provides the azimuth angle and range at several intervals of 1/30 sec. In this example the bullet tracking begins at point $A_o$ FIG. 8, which is 300 meters away from the omni-directional lens ("omnilens") at the origin O. For conciseness, it will be assumed that the tracker is a compact device at the origin O. However, the computer or other logic device that does the calculations could be separate from the optics. In that case, the origin O is the location of the imaging optics. The data calculated in Table 3, which assumes a constant bullet speed, are used to show the accuracy of the different tracking algorithms in the Passive Electro-Optical Munitions Tracker (PET) system for a variety of atmospheric conditions. One of the advantages of the proposed system is that several methods of analysis can be carried out independently of one another, thus providing checks and balances and a higher degree of confidence to the projected values.

In this calculated example, the bullet's trajectory, line 801, crosses the azimuth $A_0O$, segment 802, at an angle β=40°. It is assumed that the tracker is taking new azimuth readings of the projectile every Δt=1/30 sec, which results in array of azimuth angles $α_i$ 803. Every time segment Δt, the bullet travels a distance $Δ=Δt*V_B$, shown as segments 810, where $V_B$ is a bullet speed (which in the PET system is calculated from bullet temperature). In this example, the trajectory was simulated for $V_B$=853 m/s and $A_0O$=300 m. In the following calculation, it is assumed that the azimuth angles $a_i$ are measured in the plane containing the bullet trajectory (approximated to a straight line) and the position O of the tracker. That usually gives more accurate results than measurements projected into the local absolute geodesic azimuth plane.

As long as the trajectory approximates to a straight line in the plane of computation, the choice of computational frame of reference does not typically significantly increase the computational burden because, as discussed elsewhere in this specification, the observed trajectory is in any case transposed from the (usually severely distorted) camera pixel array space to a real world space.

The first 10 sets of trajectory data for the array are shown in the Table 3, which follows:

TABLE 3

Trajectory data.

| i | Time(s) | $\alpha_i$ (degrees) | $A_i O$(meters) |
|---|---|---|---|
| 0 | 0.000 | −30.000 | 300.000 |
| 1 | 0.033 | −26.242 | 278.818 |
| 2 | 0.067 | −21.888 | 259.030 |
| 3 | 0.100 | −16.848 | 240.977 |
| 4 | 0.133 | −11.046 | 225.079 |
| 5 | 0.167 | −4.442 | 211.820 |
| 6 | 0.200 | 2.930 | 201.723 |
| 7 | 0.233 | 10.931 | 195.277 |
| 8 | 0.267 | 19.303 | 192.851 |
| 9 | 0.300 | 27.704 | 194.593 |
| 10 | 0.333 | 35.787 | 200.395 |

As was stated earlier, there is a slight delay for the bullet to heat up to a maximum temperature relating to its terminal velocity. In the simulations which follow it is assumed that by the first measurement the bullet has already heated up to its speed-associated temperature.

1.4.1 Algorithm I—Tracking the Bullet in Clear Atmosphere Using Effective Sensor Irradiance to Determine Apparent Brightness Under clear and undisturbed atmospheric conditions (no smoke, fires, explosions, etc), the optical transmission during the tracking can be assumed to be the same in all directions from bullet to sensor and constant over time. For this condition the ratios between bullet image irradiance on the sensor (after sensor calibration—dark, light and bias frames) from one frame to the next directly relate to the direction of its trajectory angle 804 ($\beta$) of FIG. 8. In the case when the bullet is moving closer to the sensor, the irradiance ratios from one frame to the next always exceed a value of one (increasing over time, as the calibrated signal for each pixel or set of pixels is increasing). When the bullet is receding from the sensor these ratios are less than one (as the calibrated signal for each pixel or set of pixels is decreasing). This set of ratios, together with the measured azimuthal data from the bullet's trajectory (obtained by noting which pixels on the sensor are "activated" by the radiation from the bullet), and the speed calculation from two MWIR bands described above, provide the basis for the Apparent Brightness (AB) algorithm. The key principle of this algorithm is that the irradiance on the sensor for a particular frame is related to the square of the distance of the bullet from the sensor (correcting for dark noise and other factors, including the optical train, and the corrections for individual pixels associated with so-called "skew" bullet trajectory paths—see below for details). Using the "relative" distances for two frames and the change in azimuth angle 803 between these two frames, one can solve for the angle 804 ($\beta$) in FIG. 8. By using more sets of distances, a more exact value for $\beta$ can be calculated through an application of the least square method. Once angle 804 ($\beta$) is calculated, the distance to the projectile can be determined by calculating the distance traveled by the bullet from one frame to the next, which is determined by its speed (derived from the ratio of the two MWIR bands). The law of sines can now be applied to find the actual distances. A more rigorous treatment of this algorithm follows.

The energy $E_i$ coming to the sensor, which is sum of the energies in the two MWIR sub wavebands, is $$E_i = E\Omega/4\pi = E\, r^2/4x_i^2 \tag{2}$$

where:
E is the energy radiated by the bullet,
$\Omega$ is the solid angle of the light cone collected by the sensor,
r is the radius of the sensor's entrance pupil and
$x_i$ is the current distance.
So $$E_i/E_0 = x_0^2/x_i^2 \tag{3}$$

From the triangle 805 ($OA_0A_i$) FIG. 8

$$x_i/\sin(\beta) = x/\sin(\beta+\alpha_i-\alpha_0) \tag{4}$$

Hence, $$E_i/E_0 = \sin^2(\beta+\alpha_i-\alpha_0)/\sin^2(\beta) \tag{5}$$

So the direction of the bullet trajectory—angle 804 ($\beta$) can be found using least square optimization from criterion shown in Eq. (6)

$$\sum_{i=1}^{N}[E_i/E_0 - \sin^2(\beta+\alpha_i-\alpha_0)/\sin^2(\beta)]^2 = \min \tag{6}$$

or $$\sum_{i=1}^{N}[E_i/E_0 - q_i]^2 = \min \tag{7}$$

Linearization of Eq. (7) in regard of variable $\beta$ gives [9]

$$\sum_{i=1}^{N}\left[E_i/E_0 - q_i - \left(\frac{\partial q_i}{\partial \beta}\right)\Delta\beta\right]^2 = \min \tag{8}$$

The solution of Eq. (8) is $$\Delta\beta = \sum_{i=1}^{N}(E_i/E_0 - q_i)\left(\frac{\partial q_i}{\partial \beta}\right) / \sum_{i=1}^{N}\left(\frac{\partial q_i}{\partial \beta}\right)^2 \tag{9}$$

where $$\frac{\partial q_i}{\partial \beta} = -2\sin(\beta+\alpha_i-\alpha_0)\sin(\alpha_i-\alpha_0)/\sin^3(\beta). \tag{10}$$

Angle $\beta$ will be found after several optimization cycles solving Eq. (9). In each cycle, after $\Delta\beta$ is found, angle $\beta$ is corrected using the expression $\beta=\beta+\Delta\beta$. The cycle continues to be executed until the absolute value of the increment $\Delta\beta$ is sufficiently small to stop the process. Once $\beta$ is determined then the law of sines can be used to calculate the distances of the bullet to the sensor at various points of its trajectory. The distance traveled by the bullet, $A_0A_i$, provides the "missing" length for the application of the law of sines. The speed over a particular time period determines distance $A_0A_i$. The approach works even if the speed is changing. Further refinement is possible through the use of ballistic equations to determine the actual path of the bullet from its source. Application of the algorithm to 3D is simplified by the fact that bullets travel nearly in straight lines over the distances that prevail in the field. This allows the approach to assume that the path will be on a plane. This allows the same 2D algorithm to be used even when the bullet or other projectile is fired from an elevation position lower or higher than the intended target of the bullet.

A simulation was carried out using the above approach using the azimuthal trajectory data shown in Table 3, and taking into account the possible error in estimating the speed. The array of ratios $E_9/E_0$ was calculated using Eq. (3) with 1% Gaussian noise. The results, described below, are very promising and indicate that the angle β can be estimated using the above approach to within 0.2° of the actual angle of 40°. This allows the distance from the tracker to the first frame where the bullet is detected (where it has heated up sufficiently to be detected) to be determined within 0.1 meters of the actual distance of 300 m. (The actual firing point may be slightly different as the heat up distance is on the order of 1 to 2 meters, even assuming the whole initial part of the bullet's trajectory is visible to the tracker). A detailed discussion follows which describes in more detail how the speed of the bullet is calculated with a representative CCD camera (such as those from FLIR [7]) and how this information is used to arrive at the final determination of distances.

A representative sensor chip suitable for this application (FLIR makes several) has a square CCD sensor array 640 by 512 pixels. Therefore, the largest circle that can be imaged onto that chip has an outer perimeter of 1608 pixels, which for the omnidirectional system represents 0.22° of azimuth angle per pixel. The CCD camera records the bullet image during the entire 1/30 second integration time. Each pixel records the bullet image during as much of the 1/30 second integration time as the bullet is in the solid angle of the field viewed by that pixel. So for the first frame of bullet tracking, $\Delta\alpha_i$=3.758° (Table 3) and the bullet is viewed by 17 different pixels during the 1/30 second integration time. In the final image frame, the bullet image is a smear 17 pixels in width. To determine a defined instantaneous bullet position, the position at the middle of this smeared image for this frame will be chosen. Suppose that the bullet radiates a constant amount of IR energy into the camera during the time of integration for the frame. How much of the 1/30 of a second each pixel was irradiated for is then directly proportional to the integrated energy it has captured. It is obvious that the interior pixels of the smeared image all have the same integration time. However, the end pixels in the smeared image typically receive less energy than the interior ones, as the bullet position starts and ends in an interval less than 0.22° azimuth angle. The ratio of energy received by an end pixel to the energy received by an interior pixel provides the actual angular extent traveled by the bullet for the end pixel. So the bullet location in CCD pixel coordinates for each frame of the image can be found as $$dk=[(k+1)+(h-1)]/2+[(I_k/I_{h-1})/2-(I_k/I_{k-1})/2] \text{ where} \qquad (11)$$

k is the pixel number at which the bullet entered the frame, h is the pixel number at which the bullet exited the frame, and $I_k$, $I_h$ are the bullet signals of the ends of the smeared image.

The bullet may have a "skew" trajectory with a change in elevation (as well as azimuth) relative to the CCD pixel array, either because the bullet is actually changing elevation, or because of the distortion inherent in projecting a sphere onto a planar square grid. The smear line can then be found using Raster to Vector (R2V) algorithms, which are well developed and understood in the field of Computer Aided Design (CAD) [10]. The computer software then creates a virtual pixel array, so that the image of the trajectory on the virtual pixel array resides on a single row or single column of the virtual pixels. This array has the same pixel size as an actual receiver (or could have a slightly different one if desired) but the pixel grid is rotated, positioning the first and last pixels of the smeared bullet image at the same elevation on the virtual array. The effective irradiance at each virtual pixel is the sum of recorded corrected values of the actual pixels covered by the virtual pixel weighted with coefficients equals to what portion of the actual pixel is covered by this virtual pixel [11]. Where the R2V calculation results in a smear image that is wider than one virtual pixel, the pixels in each column or row perpendicular to the length of the smear may be binned to give a single number for ease of calculation. The position of the bullet at the middle of the integration time will be calculated in the virtual array coordinates using the above equation and then the coordinate system is rotated back.

In the case of using an imager with precalculated distortion, like an omnidirectional lens, the smear curve is localized using the R2V technique. Following this, the local raster area is mapped from the image space to the object space. The distorted raster image in space is superimposed with a rotated raster array and the smear center will be found using aforementioned technique. Algorithms for this have been extensively developed for several applications including astrophotography, geographic information systems (GIS) and pattern recognition.

By knowing the distortion of the imaging lens, the coordinates of each pixel and its "partial" pixel size (end pixels) can be mapped to its respective azimuth position. Let us assume that this method yields an accuracy of the bullet spot location to 1/3 of a pixel (a reasonable assumption). Based on this assumption this will add a Gaussian noise with 0.075° standard deviation to azimuth array $\alpha_i$. To see the accuracy of this method the least squares estimate of trajectory angle 804 (β) began with an initial estimate of 20°. (However, a fairly accurate estimate of angle 804 (β) can be obtained by assuming that the square root of the integrated signal value for any two pixels, taking into account individual pixel calibrations, represents the "relative" distance of the bullet from those pixels.) As the azimuth angles associated with each pixel are known, angle 804 (β) can be estimated by application of AB least-square method shown above. The optimization cycles determine angles 804 (β): to be respectively 27.07°, 34.05°, 38.51°, 39.71°, 39.76° with the next step yielding a value for Δβ of 0.001°, which indicates convergence is achieved.

Now that β has been calculated (we will assume the calculated value is 39.76° or approximately 0.2° less than the actual value), we must include the error in measuring the bullet temperature. A bullet muzzle velocity of 853 m/s heats the bullet to about 601° K. Assuming there is a 7° K accuracy for the temperature estimation then in one worst case the measured temperature will be 594° K. This results in an estimated 840 m/s speed (FIG. 1), which is 15 m/s below the actual value. Using the predicted values for angle 804 (β) and the speed, we can determine the distance by application of the law of sines to triangle 805 ($OA_0A_1$) (FIG. 8) where angles 804(β) and $\alpha_1-\alpha_0$ are known and segment $A_0A_1$=840 m/s*(1/30 s) or 28 m. Solving for distance 802 $OA_0=x_0$ in the triangle yields an answer of 299.93 m, which is less than 0.1 m from the actual distance.

The tracking data results in an array of distances 802 to the successive positions of the projectile, and arrays of the projectiles's azimuths and elevations measured in the local tracker coordinate system. If the tracker is expected to be mobile in use, the tracker may be equipped with a fiber gyroscope or similar device, by which the tracker's Tait-Bryan angles (yaw, pitch and roll) can be determined. With that information, the tracking data can be transformed to absolute local geodesic coordinates using the matrix formalism shown in ref. [12] or similar approaches known to those skilled in that art. If the tracker is expected to be stationary in use, the tracker may operate in its own coordinate space, or may be calibrated to an absolute coordinate space at startup.

This approach is sufficiently accurate for the case where there is homogeneous (clear) atmosphere and the optical transmission is the same for all azimuth angles during the bullet tracking. This is true for many practical cases. Even when the atmosphere over battlefield space is distorted by fire, explosions, smoke clouds and extensive arms fire, or other natural conditions, the above solution can be considered as the first approach to the next step in the process.

1.4.2 Tracking in Non-Homogeneous Atmosphere Conditions.

When dealing with non-homogenous conditions there are two possible approaches to determining the position of the bullet, the azimuth-geometrical method and the triangle fitting method. We will start with the geometrical method.

In this approach it is assumed that the bullet is not changing speed over a range of acquisition points. Further, this method only works well when the bullet path either ends near, or crosses, a perpendicular from the straight line path of the bullet to the position O of the tracking system. This perpendicular line is exemplified by dot-dash line 806 in FIG. 8. In this case, the system looks for two consecutive frames where triangles 807 ($A_{i-1}A_iO$) and 808 ($A_iA_{i+1}O$) are close to being equal. This occurs when the absolute value of ($\Delta\alpha_i - \Delta\alpha_{i+1}$) is a minimum. Such points are exemplified by points i=8 and i=9 in Table 3, having respectively $\Delta\alpha_8$=8.372° and $\Delta\alpha_9$=8.401°. This approach clearly does not work for all bullet trajectories. The system can determine if the necessary condition has occurred by comparing the increase or decrease in $\Delta\alpha$ from one frame to the next. If there is a change in the sign of the second derivative from one frame to the next for these angles then the criteria has been met. In this case, $\Delta\Delta\alpha_7$=0.371°, $\Delta\Delta\alpha_8$=0.029° and $\Delta\Delta\alpha_9$=0.318°, so the extremum criterion has been met. The linear interpolation of the second derivative of the angle $\alpha$ gives the location of its zero value at the position $\alpha_8$+0.0699*($\alpha_9-\alpha_8$)=19.303°+ 0.0699*8.401°=19.89°. In this case $\beta$=[90°−(19.89°+30°]= 40.11°. The calculated azimuth value of 19.89° turns out to be close to the angle made by dot-dash line 806 of FIG. 8, which is the actual normal. This estimate has a confidence interval of ($\Delta\alpha_i + \Delta\alpha_{i+1}$)/2. This approach can be used in the case where the measured $\alpha$-angles are not close to the angle made by the normal through the use of interpolation, although accuracy may decrease if the measured $\alpha$ angles are too far from the normal. Extrapolation can be used to predict the angular position of the actual normal even for the case where the trajectory of the bullet stops before reach the normal. This can be derived using the values for the first and second derivatives of the measured $\alpha$-angles. Thus if we know the azimuths of the projectile up to point 8 in Table 3, we can extrapolate the position of zero value of $\Delta\Delta\alpha$, which is the estimated azimuth of the actual normal. With $\Delta\Delta\alpha_6$=0.629° and $\Delta\Delta\alpha_7$=0.371°, $\Delta\Delta\alpha$ will be zero at the azimuth $\alpha=\alpha_7+(\alpha_7-\alpha_6)*[(0.371/0.629)/(1-0.371/0.629)]$=21.9°. While this extrapolation provides a less accurate approach to determining the position of the actual normal than the earlier described method, with more data points some which cross the extremum, it is still close enough to be used to find the initial value of $\beta$ for next step of optimization.

It is useful to compare the two estimates for the angle $\beta$ obtained from the AB approach and the geometrical approach. If the Apparent Brightness method estimate is inside the confidence interval for the azimuth of the actual normal to the trajectory (the actual normal is somewhere within this interval) it should be chosen as the value used in the next optimization step. In this instance, the geometrical approach corroborates that the AB approach is working well. The clear atmosphere approach is then more reliable than the geometric one and $\beta$=39.76° is chosen. If the discrepancy between the two approaches is greater than the confidence interval, then the average of the values of angle $\beta$ obtained from the AB and geometrical estimation approaches is used in final method of triangle fitting.

The final method of triangle fitting relies on the fact that the ratio of the powers in the two key MWIR wavebands will not be significantly affected by nonhomogeneous atmospheric conditions. The absolute transmission may be affected, but the transmission in each MWIR sub waveband will be affected nearly the same way along any line of sight even under these conditions. So, the projectile temperature and hence its speed, as well as the array of azimuth angles, will be known. In this optimization, triangles with known base lengths (product of bullet speed and frame time) and known angles at the apex (which are derived from the azimuth angle) are used. A series of initial distances 802 ($A_0O$) are tested. For each distance 802 ($A_0O$) estimate, the angle $\beta$ is found which optimally fits the array of azimuth-speed data. The pair {$A_0O$, $\beta$} which best fits the data with the minimum deviation from the so-called triangle requirement, is the so-called triangle fitting (TF) solution.

It should be obvious that the TF algorithm can be sped up by using angle 804 ($\beta$) and distance 802 ($A_0O$) found by the first two algorithms. However, the TF algorithm is quite robust on its own. A more detailed description of the algorithm follows.

For every triangle $A_0A_iO$ the law of sines yields:

$$i*\Delta/\sin(\alpha_i-\alpha_0) = OA_0/\sin(\alpha_i-\alpha_0+\beta) \quad (12)$$

Hence we wish to minimize $$F = \sum_{i=1}^{N} [\sin(\alpha_i - \alpha_0) - (i*\Delta \cdot \sin(\alpha_i - \alpha_0 + \beta))/OA_0]^2 \quad (13)$$

where distance 802 ($OA_0$) and angle 804 ($\beta$) are unknown variables to be estimated.

Equation 13 is the criterion for nonlinear least-square optimization. The optimization goes in cycles with a number of estimates of distance 802 ($OA_0$) and then an optimization of angle 804 ($\beta$). The ($OA_0,\beta$) pair delivering the minimum F is chosen as the solution. In the following example a bullet has a muzzle velocity of 853 m/s which heats the bullet to about 601° K. As done previously it is assumed that temperature estimation has an accuracy of ±7° K which using the lower error figure, yields a temperature of 594° K, and an estimated speed of 840 m/s. An initial distance 802 ($A_0O$) is 290 meters and distances up to 310 meters are tried. A confidence interval of ±10 meters around a distance of 299.93 meter was found above using AB optimization. Mismatches F in Equation 13 and least square optimized values of angle 804($\beta$) were tabulated at 0.2 meter increments for distance 802 ($OA_0$). Several solutions with close to minimum values of F are shown in Table 4.

TABLE 4

Least Squares optimizations of angle 804($\beta$)

| $A_0O$ | $\beta$ | F |
|---|---|---|
| 290 m | 40.23° | 0.0052 |
| 295.2 m | 40.02° | 0.0010 |
| 295.4 m | 40.016° | 0.00097 |
| 295.6 m | 40.0086° | 0.00093 |
| 295.8 m | 40.005° | 0.00093 |

TABLE 4-continued

Least Squares optimizations of angle 804(β)

| A₀O | β | F |
|---|---|---|
| 296 m | 39.99° | 0.00097 |
| 296.2 m | 39.98° | 0.001 |
| 296.4 m | 39.97° | 0.001 |
| 296.6 m | 39.96° | 0.0011 |
| 296.8 m | 39.96° | 0.0012 |
| 310 m | 39.42° | 0.0277 |

The best estimate of distance 802 ($A_0O$) in Table 4 is 295.8 m and β=40.005° with an "F" number of 0.00093. Some reduction in accuracy is expected for a turbid atmosphere. Nevertheless the results are sufficiently accurate to back-track to the shooter. To achieve the highest potential tracking accuracy, cooled MWIR CCD's should be used. Such CCDs have much less inherent dark noise (and thus increased signal to noise ratio) and less sensitivity variation from one pixel to the next compared to non-cooled sensors. In any case the highest accuracy will be achieved when a proper calibration is carried out on the system prior to its being deployed.

1.4.3 Tracking With a Conventional Staring Camera.

The tracking optics can alternatively comprise a conventional imaging lens with a 40° field of view. The beamsplitter can be mounted in image space to separate the two MWIR sub wavebands, or two mutually aligned cameras with band filters can be used. Such a two-camera optical arrangement restricts the field of regard for sniper location, but will be advantageous for light gathering power and consequently reduce the error in bullet temperature-speed estimates. A 40° field camera with a VGA CCD array will give 0.08° azimuth accuracy for each pixel. Assuming ⅓ of a pixel tracking accuracy and 4° K bullet temperature estimation accuracy, the bullet speed in the tracking example above can be estimated as 846 m/s instead of the actual value of 853 m/s. A trajectory optimization was carried out using 8 points of trajectory (809 in FIG. 8), spanning azimuths from −30° to 10° relative to the normal 806. The optimization estimated distance 802 ($A_0O$) as 297.8 m and angle 804 (β) is 40.12°. In this example the tracking accuracy is close to the accuracy of tracking with an omnidirectional lens. The improvement of the signal to noise ratio did not result in better tracking accuracy because the number of tracked points is small. The major advantage of the 40° field of view system is that its greater light-gathering power enables it to resolve a bullet further away than the omnidirectional one. For existing VGA size sensors and a typical bullet, the omnidirectional system has a range of 0.6 km, whereas the narrow field system can resolve out to 2 km. This makes it ideal for applications on UAV or helicopter.

1.5 Self Protection

Real time MWIR imagery analysis can warn against incoming rounds. A projectile's track with unchanging azimuth but increasing MWIR signature is a collision indicator. Depending upon the vehicle there may be time for evasive maneuvers, at least to alter the impact point to a less vulnerable part of the vehicle, or onto reactive armor.

1.6 PET Operation Flow Chart.

Figure 9A:
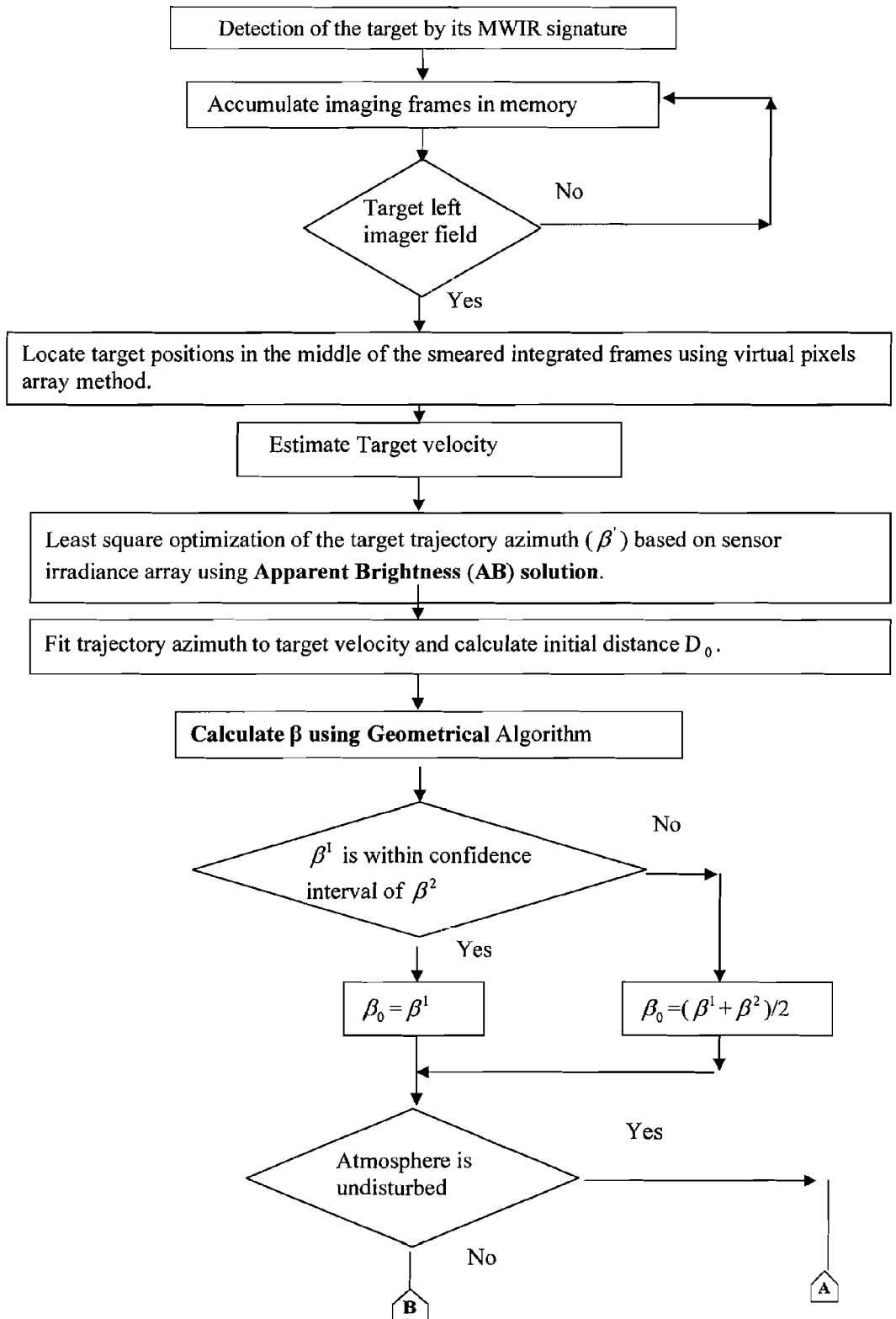
FIGS. 9A and 9B are a flow chart of a combined projectile tracking algorithm.
Figure 9B:
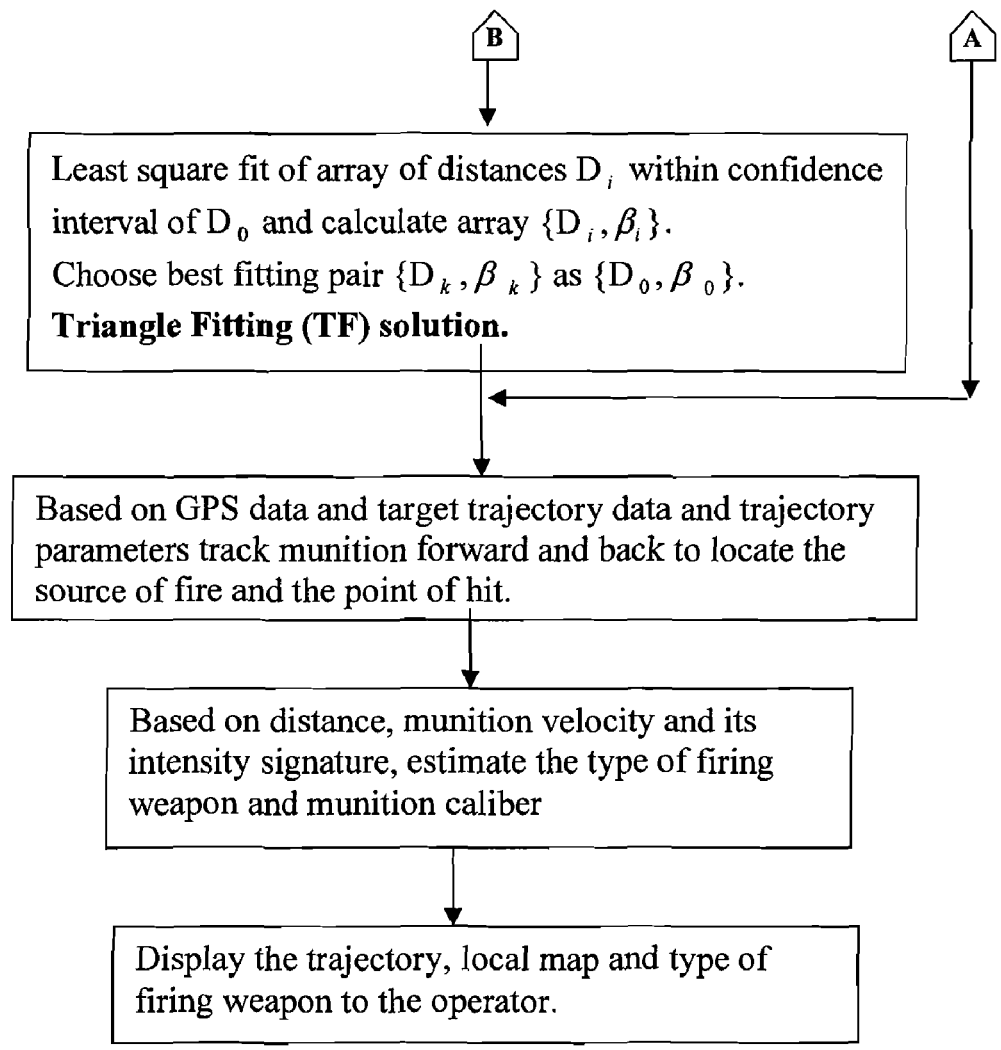

A flow chart incorporating all three of the projectile tracking algorithms is shown in FIG. 9A and FIG. 9B, collectively referred to as FIG. 9. However, it is anticipated that for most situations, the AB approach will work just fine on its own.

The practical limit on how quickly a trajectory can be determined is likely to be the time in which a sufficient number (typically at least 10) of distinguishable projectile positions over the trajectory can be recorded.

1.7 Preliminary Design and System Functionality Considerations.

1.7.1 PET Omnidirectional Optics.

Figure 10:
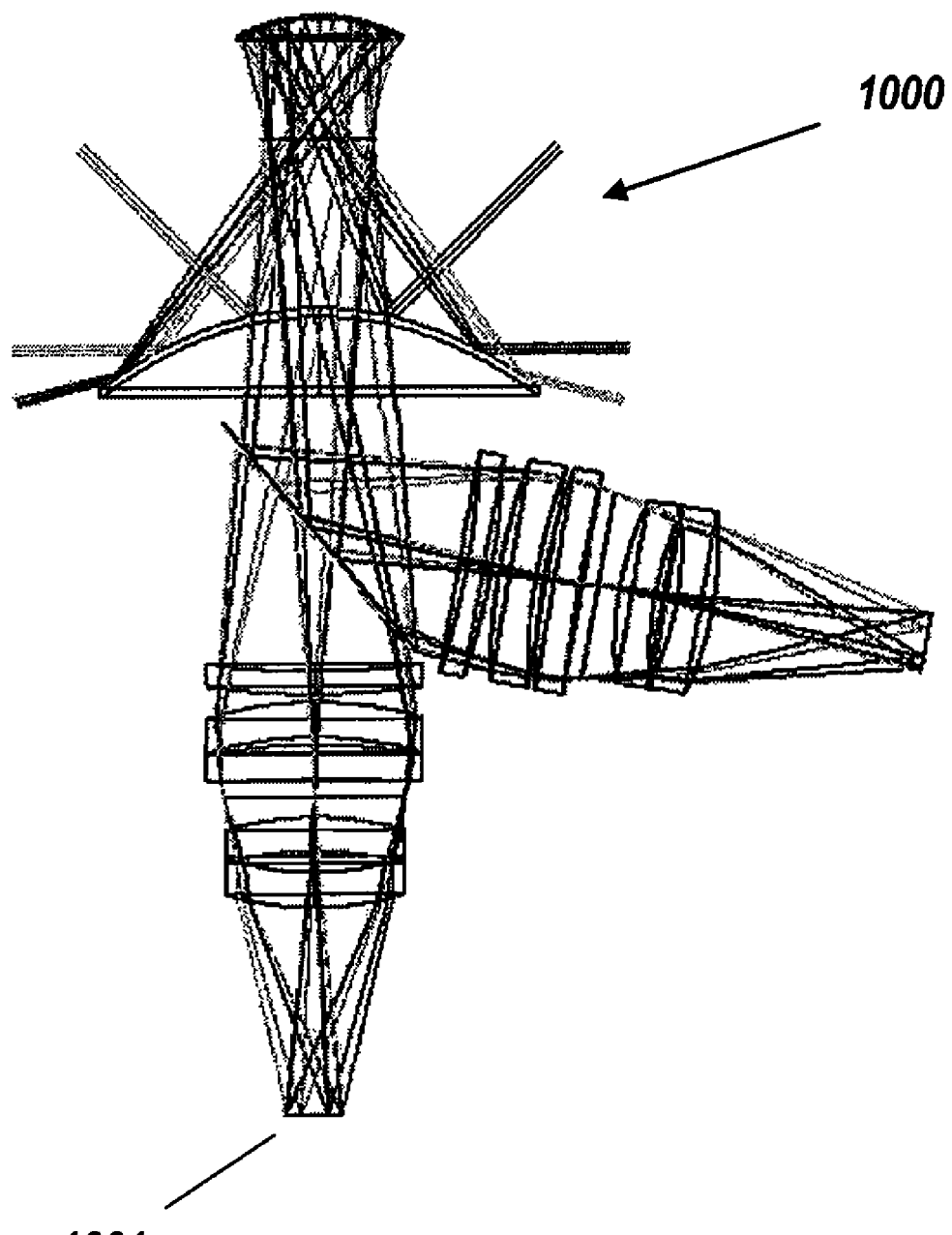
FIG. 10 is a view similar to FIG. 5 of an omnidirectional optic with a beam splitter for directing dual subbands to separate detectors.
Figure 11:
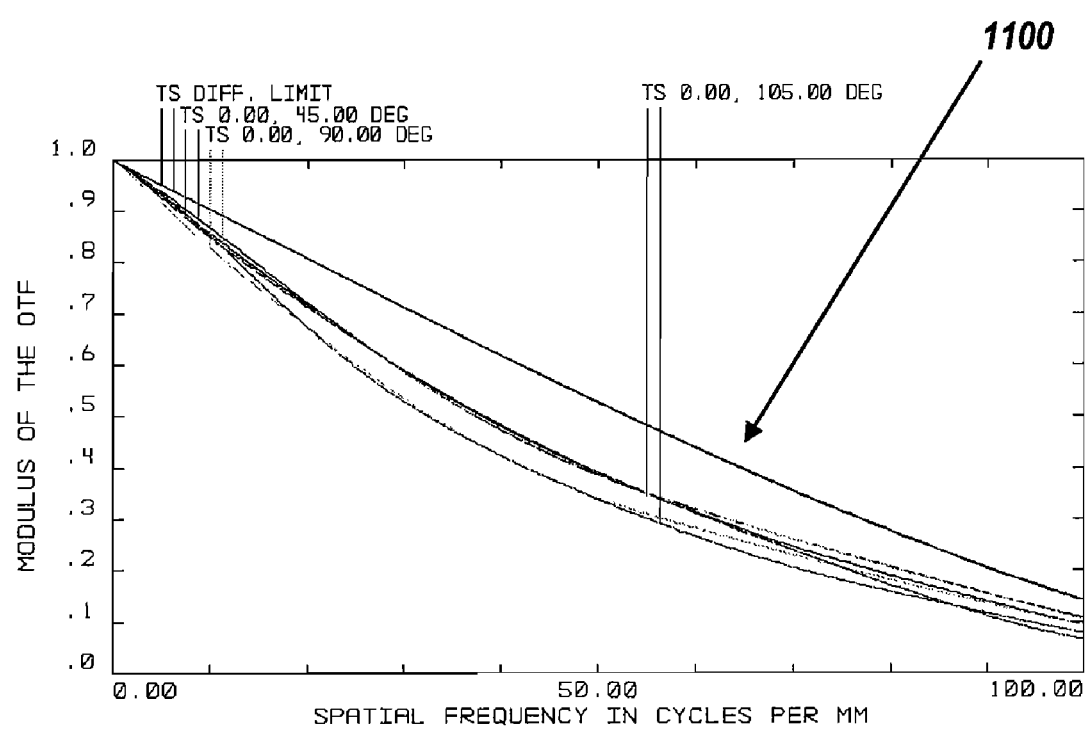
FIG. 11 is a graph showing optical transfer function as a function of spatial frequency.

To estimate the system power budget, possible operational distances and other characteristics, a preliminary optical design of the dual-band omnidirectional lens has been developed with a two-mirror panoramic head, initially only for ground based projectile tracking. The proposed design uses a cooled FLIR camera, the Photon HRC [7], with an InSb 640×512 pixels CCD with a 15 μm pitch. The layout of the lens 1000 is shown in FIG. 10. The lens has a ring-shaped image 1001 with 3.85 mm radius for an input field from 45° above horizon to 15° below. The optical transfer function 1100 is shown in FIG. 11. While a CCD with 15 μm pitch would require 33 line-pairs/mm resolution, the designed lens attains 60 lp/mm. The surplus resolution is due to attempts to increase the light gathering power of the lens to obtain the maximum operational distance. In the preliminary design image space the F number (F#) was 1.5, with entrance pupil diameter of 1.6 mm. While this is a good enough F#, further improvements are believed to be possible to achieve F# of 1 and entrance pupil diameter of 2 mm.

1.7.2 Object to Image Space Transformation in the Omnidirectional Lens.

Figure 12:
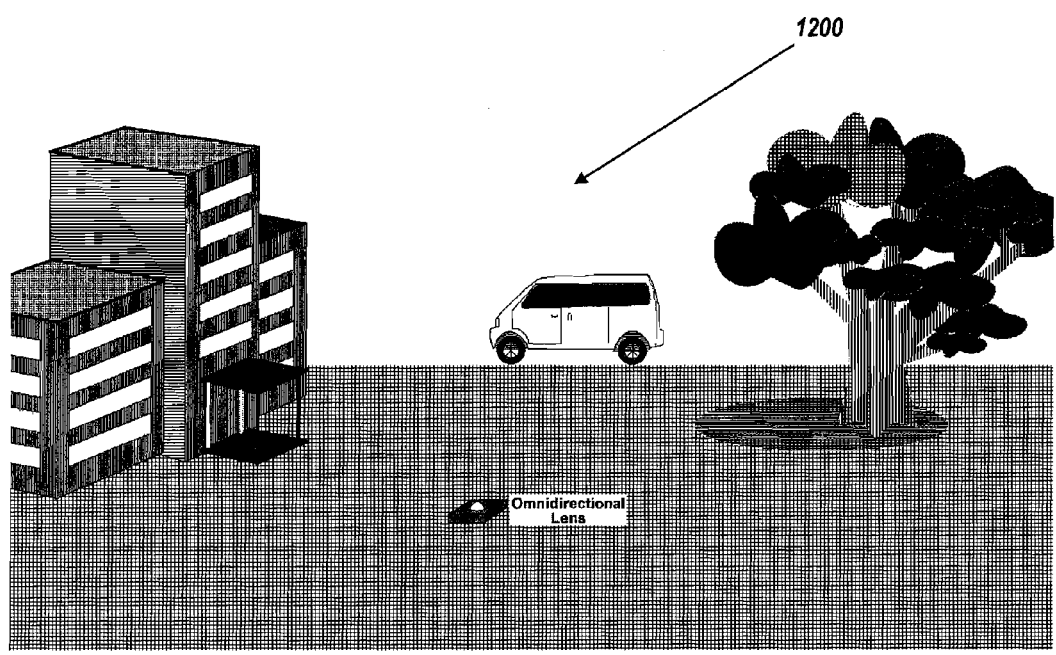
FIG. 12 is a perspective view of an urban scene.
Figure 14:
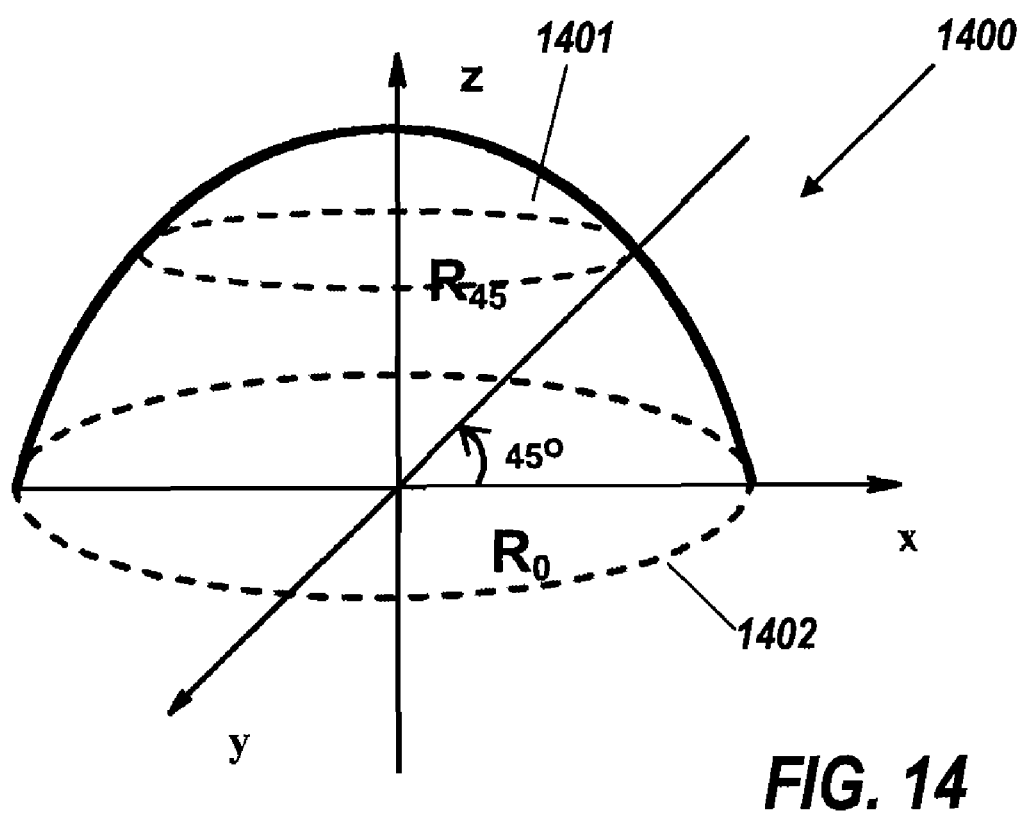
FIG. 14 is a diagram of spherical coordinates in the field of view.

The omnidirectional lens 1000 shown in FIG. 10 images any objects located at lower elevation angles to the outer circle of the CCD image and objects located at high elevation angles to the inner circle. FIG. 12 shows a 3D suburban scene 1200 and FIG. 13 its annular image 1300. Those objects with an elevation of negative 15° are imaged at a radius 3.85 mm at the image plane of the lens shown in FIG. 10. Objects with elevation 0° are imaged at a radius 3.8 mm and objects with elevation +45° are imaged at radius 1.86 mm. So the ratio of length of image circle of input field with elevation 45° to length of image circle of input field with elevation 0° is one half. The undistorted imaging in spherical coordinates 1400, which is shown in FIG. 14, requires that the ratio of length of circle 1401 ($R_{45}$) to length of circle 1402 ($R_0$) is 0.707. So the omnidirectional lens produces some distortion of the output field relative to the input field in spherical coordinates, with a 30% reduction of resolution for high elevation angles. This distortion will not dramatically reduce the tracking accuracy. The tracking accuracy for undistorted atmospheric conditions for bullets moving at 0° elevation is 0.1 m in distance and 0.2° in azimuth. This degrades to 0.14 m and 0.28° for bullets moving at 45° elevation, which is still good enough to locate the source of fire and undertake timely countermeasures.

1.7.3 Power Budget.

The main characteristic of sensitivity of IR receivers is Specific Detectivity D*

$$D^* = \sqrt{Af}/\text{NEP, where} \quad (14)$$

A is pixel area,
f is the acquisition frequency,
NEP is noise equivalent power.

Figure 15:
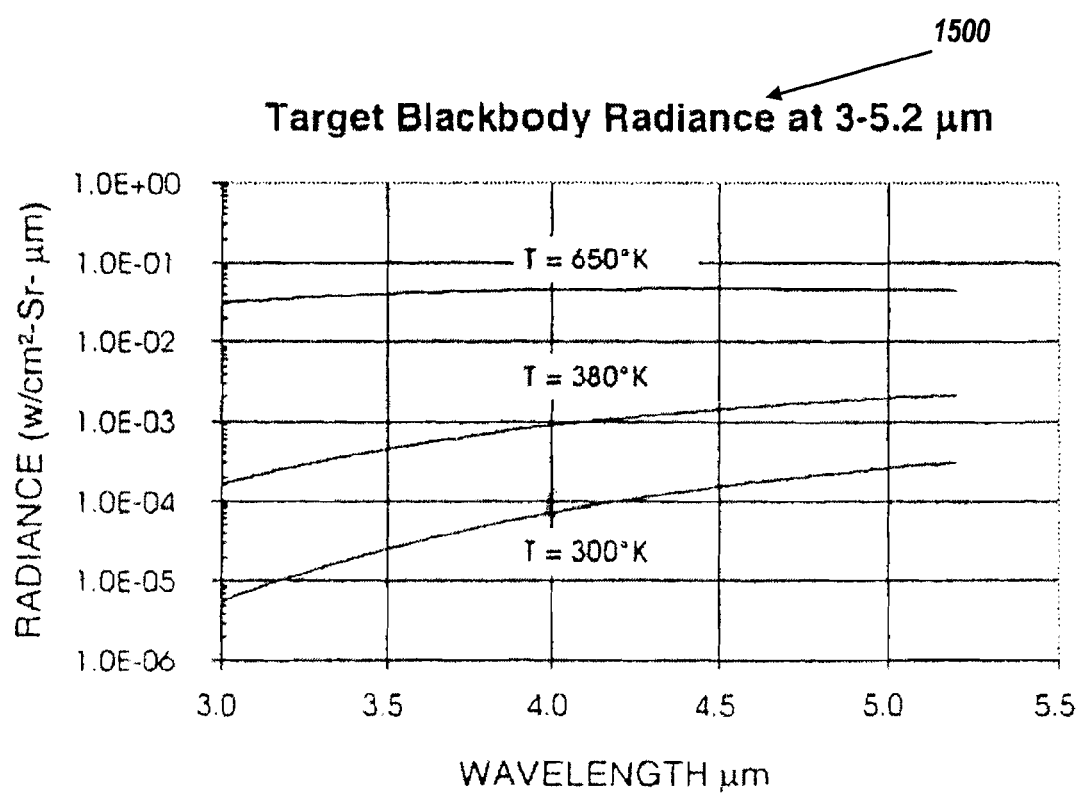
FIG. 15 is a graph of projectile radiance spectrum at different temperatures.

The Specific Detectivity D* of a cooled InSb CCD is $10^{12}$ (cm $\sqrt{\text{Hz}}$/W) [1]. So for a 15 μm pixel and 30 Hz acquisition rate, the NEP is $8 \times 10^{-15}$ W. The M16 round has a muzzle velocity of 930 m/s (Mach 2.7). Extrapolation of FIG. 1 gives a temperature of 650° K. The projectile blackbody radiance Q in the MWIR waveband is shown in FIG. 15.

As discussed above, the bullet emits IR radiation as a gray body. Ref. [1] suggests that it has an emissivity ε of 0.8. Measurements of the emissivity of an unused bullet with a brass jacket using a calibrated camera and heater give a value of 0.3 [3]. High-velocity bullets typically have steel jackets. For dull steel, ε=0.44 [8] and for steel alloys it can reach a value of 0.95. This can explain the difference in emissivity data shown in Refs. [1] and [3]. Assuming an emissivity 0.5 for a bullet therefore should be a reasonably conservative value.

The M16 bullet is 5.56 mm diameter and 23 mm in length. Treating its radiating area as a cone with a 23 mm height and 5.56 mm diameter at the base, the radiating area S is 2.26 cm². The projectile blackbody radiance 1500 (U) is shown in FIG. 15. In each 1 μm sub-waveband (3.0-4.2 μm and 4.2-5.3 μm) the bullet radiates energy $$Q = U * S * \epsilon \text{ W/Sr.} = 0.1 * 2.26 * 0.5 \text{ W/Sr} = 0.12 \text{ W/Sr.} \quad (15)$$

Given that the preliminary designed omnidirectional optics achieves a 2 mm diameter entrance pupil then the solid angle ω from the bullet to the entrance pupil at distance D can be calculated as follows:

$$\omega = \pi (d/2)^2 / D^2 \quad (16)$$

and at a distance of 500 m $$\omega = 3.1415 * 10^{-6} / 25 * 10^4 = 0.12 * 10^{-10} \text{ Sr} \quad (17)$$

Therefore the energy, E, which reaches the receiver is, $$E = Q * \omega = 0.12 \text{ (W/Sr)} * 0.12 * 10^{-10} \text{ Sr} = 144 * 10^{-14} \text{ W} \quad (18)$$

These calculations do not take into account any atmospheric transmission losses, which are usually minimal. FIG. 3 shows there is a 95% transmission at a distance of 1800 m. According to the Bouguer law, at 500 m the transmission will be 98.5%. The pixel NEP is $8*10^{-15}$ W.

If the bullet is moving directly towards the sensor and the distance is 500 m the signal to noise ratio (SNR)

$$\text{SNR} = 144 * 10^{-14} / 8 * 10^{-15} = 180, \quad (19)$$

and at 300 m distance the SNR will be 500.

This is better than a 2% noise ratio used in the projectile tracking simulation in previous sections. The power budget results have therefore done better than the earlier conservative estimates.

If the bullet is moving tangentially to the sensor direction there will be a smear across multiple pixels during the 1/30 sec frame recording time. For 1/30 sec the bullet will travel 31 m. At a distance of 500 m from the sensor this amounts to 3.54° in angular coordinates. It will give the maximum smear and lower signal to noise ratio at low elevation angles, which are imaged at the receiver's external circle. The external circle length for a 640*512 pixels CCD is 1608 pixels, or 0.22° per pixel in azimuth direction. During one frame there will be a smear across 16 pixels. Each pixel will get 1/16 of the bullet's energy, and the SNR is reduced to only 11. Since the acceptable SNR for projectile detection and tracking is 5 [1,3], this will suffice for bullet tracking in angular coordinates, but far from the 2%, or SNR=50, needed for bullet temperature determination. Fortunately the bullet temperature does not change during several consecutive frames. Denote the bullet energy received by a pixel in Band1 (Table 1) as A and in Band2 as B. So the temperature indicating ratio C is $$C = (A+V)/(B+V) \quad (20)$$

where V is the pixel noise level.

As is typical for MWIR image analysis, background subtraction mode will remove the dark current so that V will have zero mean and $$C = (A/B + V/B)/(1 + V/B) = (C_0 + v)/(1 + v) \quad (21)$$

where $C_0$ is the true intensity ratio between the sub-wavebands.

The variable v has a Gaussian distribution with zero mean value and a standard deviation of half of 1/SNR, which at SNR=11 will be 0.045. The important property of $C_0$ is that it depends only on projectile temperature. As the projectile image moves from pixel to pixel the atmospheric conditions at the line of sight could change, but in equal proportions in both MWIR wavebands. Thus the temperature-dependent ratio C can be averaged over number of pixels to reduce its standard deviation. Expanding this in Taylor form gives $$C = (C_0 + v)(1 - v \ldots) = C_0 + v - vC_0 - v^2 = C_0 + (1 - C_0)v - v^2 \quad (22)$$

The averaging of C over N pixels (one frame will be 16 pixels, but it is better to use several sequential frames) will give C, approaching $C_0$. Because the mean value of $(1-C_0)v$ is zero the mean value of the $C_1$ is [9]

$$\vec{C}_1 = C_0 - \sigma^2 \quad (23)$$

where $\sigma^2 = (\frac{1}{2}*[1/\text{SNR}])^2$ is variance of the v. In this case $\sigma^2 = (0.045)^2 = 0.003$.

The variance $\delta^2$ of $\vec{C}_1$ is, $$\delta^2 = (1 - C_0)\sigma^2 / N + 3\sigma^4 \quad (24)$$

where N is number of pixels being averaged.

For an M16 round heated to 650° K, $C_0$ is close to 1, and the standard deviation of $\vec{C}_1$ is $\delta = \sqrt{3\sigma^4}$, or 0.005 (0.5%). To get $C_0$ we need to average C and increase it by $\sigma^2$. The estimation of accuracy, $C_0 = A/B$, at 500 m distance is 0.5%, which is better than the 2% previously used. The computer simulation for $C_0 = 1$, $\sigma = 0.045$ and number of averaged pixels 32 (two frames), with a different set of noise component v, gives results shown in Table 5.

TABLE 5

| Simulation for $C_0 = 1$, $\sigma = 0.045$ | | | | |
|---|---|---|---|---|
| Experiment number | | | | |
| 1 | 2 | 3 | 4 | 5 |
| Estimation of $C_0$ | | | | |
| 0.9922 | 1.0028 | 1.002 | 1.0086 | 0.9987 |

The standard deviation of $C_0$, $\delta$, in Table 5 is 0.0054 (0.54%) which is in good agreement with the theoretical estimates. These calculations did not include any background radiation.

The normal background radiation in the MWIR waveband is relatively low, 0.12 mW/cm²/Sr [1], while a heated bullet has radiance three orders of magnitude higher, at 0.1 W/cm²/Sr. A normal landscape is conveniently dark in the MWIR bands of interest, because objects on the ground radiate primarily in longer infrared wavelengths, while the sun radiates primarily in shorter wavelengths, mostly visible and ultraviolet. Operating in background-subtraction mode, the informative image will be the difference between the frame with a bullet and the previous frame without, tacitly assuming that the background did not change in 1/30 of second. This operation will suppress the influence of the MWIR background radiation, which is already very small in comparison. This will also be helpful in more stressing situations of percussive background signals and other heat sources, as well as multiple rounds at once.

1.8 The Tactical Scenario of the Use of Passive Electro-Optical Tracker (PET)

Figure 16:
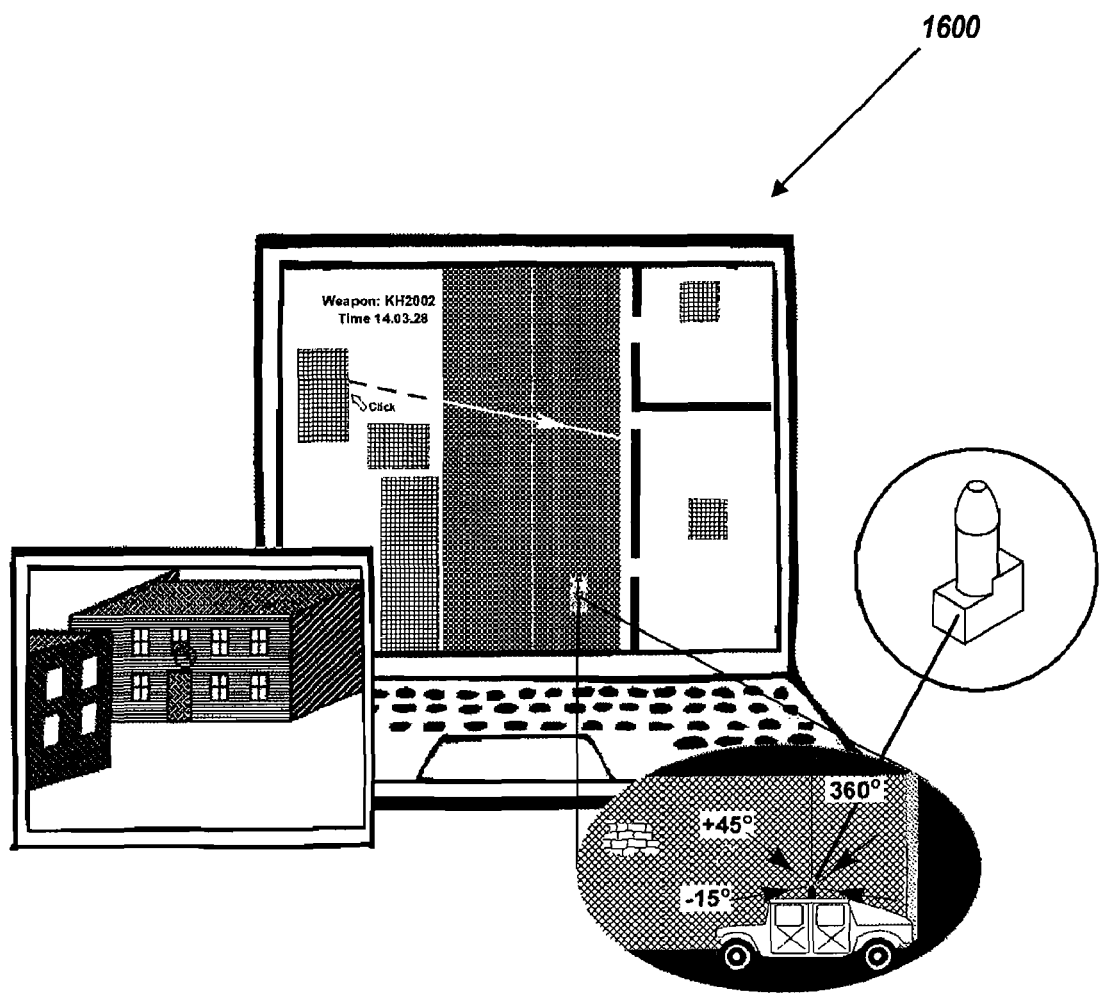
FIG. 16 is a snapshot of the system output on a computer screen.
Figure 17:
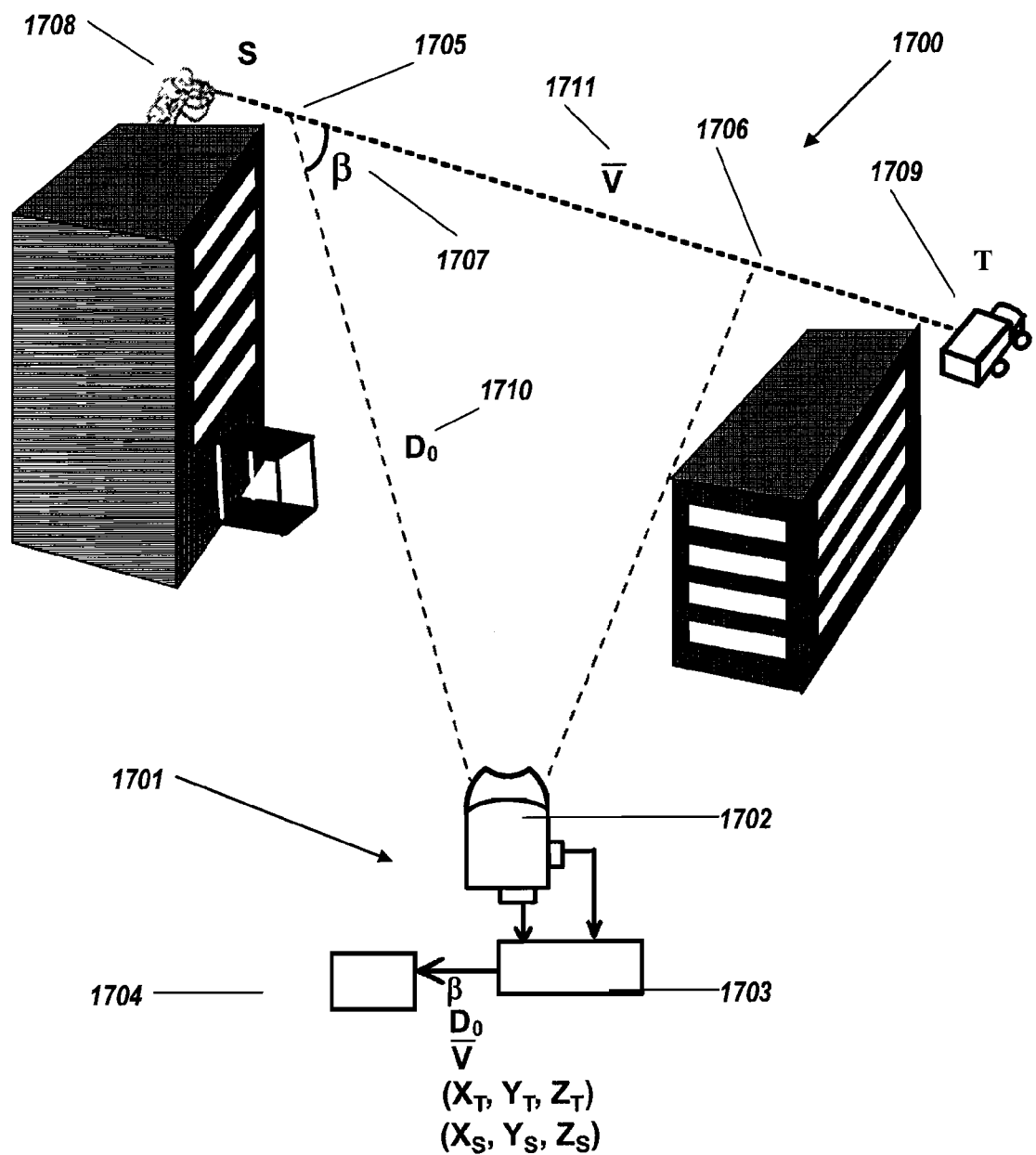
FIG. 17 is a schematic aerial view of a system operation scenario.

The PET system will continuously track multiple projectiles in the omnidirectional field of view and calculate their trajectories. In addition, it will be able to record all muzzle flashes which occur in the imager's direct sight. The PET system will calculate the complete trajectory for fired projectiles, even if only part of the trajectory was available due to the obscurations in the battlefield environment. PET will determine the source of fire and the hit points, and will be able to determine the type of projectiles and firing weapons. PET can use this projectile data and GPS information to render the local battlefield showing trajectories, source of fire and hit locations, and the time of fire. Using this data and display, field personnel may be able locate the sniper after the first shot, separate friendly fire from hostile fire, deliver automatic warnings, and prepare countermeasure actions. An example of the system screen snapshot 1600 is shown in FIG. 16. An example of the system operation scenario 1700 is shown in FIG. 17. In FIG. 17 is shown the projectile tracker 1701 with a double waveband omnidirectional imager 1702, controller 1703 and display 1704. The tracker begins to track the bullet at the point 1705 and the bullet is exiting the tracker imager field at the point 1706. After calculating the distance to the initial point of tracking 1705 and the azimuth 1707 (β) of the bullet's trajectory, the tracker extrapolates the trajectory and superimposes it with the local 3D map to locate the source of fire 1708 and the point of hit 1709.

2.0 Projected Performance and Specification of the PET System

A performance specification can be projected for the PET system based on commercially available cameras (non-military) at the time of this application and the type of optical system employed (omnidirectional vs. 40°). The resolution and range for the two optical approaches for current high-velocity bullets are as follows. Also, dimensional and other functional parameters are included.

| Accuracy | AB solution (good atmosphere conditions): |
| --- | --- |
| | Distance:- 0.2 m or better |
| | Azimuth:- 0.2° or better |
| | TF solution (intensive firing conditions): |
| | Distance:- 4 m or better |
| | Azimuth:- 0.2° or better |
| Range | 2 km for the system with 40° field of view |
| | 0.6 km for the system with omnidirectional lens |
| Weight | 1400 grams |
| Dimensions | 60 mm diameter, 180 mm length |
| Power consumption | 20 W |
| Reaction time | Projectile flight time plus 1 sec. |
| Platforms | Ground vehicle, UAV |

The mathematical approach to solving the trajectory of bullets described herein can be extended to handle larger, heavier projectiles, where the projectile travels a much longer distance than a bullet. Especially in the case of larger projectiles, the trajectory cannot be assumed to be a straight line, or even to be in a plane, as the trajectory is a space curve. The trajectory can be accurately predicted and estimated by the application of well known ballistic laws (exemplified in Ref. [13]) and properly taking into account the prevailing conditions (wind direction, location on the Earth, etc.) on the battlefield. Some of the secondary effects that could be considered in this analysis include: the Coriolis effect; gravity; atmospheric conditions such as air density, temperature, pressure and humidity; lift and sideways aerodynamics; and wind. However, one skilled in the field of the mathematics of ballistics or projectiles would be able to extend the method revealed herein once the principles taught are fully understood, and such extensions are within the scope of the present invention.

Such a skilled person would know how to balance the complexity of the algorithms and model chosen with the required or desired tracking accuracy of the system, the nature of the projectiles to be tracked, and the limitations of the available hardware and software (computer overhead, resolution of camera, etc.). For example, the solution is simplified, and the calculation overhead is reduced, if the trajectory is assumed to follow a parabolic curve in a single plane. A real trajectory in air is not of course a parabola, because drag causes the projectile to slow down, so it tends to fall more steeply than it rises. Even if the real curve cannot be handled analytically, it may be possible to match an observed trajectory with sufficient accuracy to a stored numerical model of a typical real trajectory.

When discussing the case of a bullet, it was assumed that the trajectory could be approximated to a straight line, and the most convenient plane for the computation illustrated in. FIG. 8 was then usually the plane containing the tracking device O and the trajectory line. However, if the actual trajectory is a curve in a plane (for example, artillery and mortar shells are often fired in a high, arching trajectory with only a much smaller sideways deflection) then projecting the trajectory into a plane of computation perpendicular to the plane containing the actual trajectory may be preferred. However, in matching the speed to the incremental travel distance Δ, allowance must then of course be made for the component of velocity perpendicular to the plane of computation. If the arching trajectory is viewed from the side, its shape can be extracted before projecting into a plane.

Although distinct embodiments have been described and shown in the several drawings, features from the different embodiments may be combined in a single embodiment.

Accordingly, reference should be made to the appended claims, rather than to the foregoing specification, as indicating the scope of the invention.

REFERENCES

1. D. Leslie, H. Hyman, F. Moore, M. Squire, *Surveillance, detection and 3D infrared tracking of bullets, rockets, mortars, and artillery*, SPIE Proc. Vol. 4393, pp. 193-201, 2001.
2. G. Williams, A. Barter "Dual band MWIR/LWIR radiometer for absolute Temperature measurement" SPIE Proc. Vol. 6205-23, 2006.
3. A. Richards "Application for high-speed infrared imaging" SPIE Proc. Vol. 5580, pp. 137-145, 2005.
4. W. Rohsenow, J. Hartnet, "Handbook of Heat Transfer", McGraw-Hill, 1973, Chapter 15.
5. A Takeya, Tl Kuroda, K. Nishiguchi and A Ichikawa, *Omnidirectional vision system Using Two mirrors*, SPIE Proceedings, Volume 3430, Pages 50-60 (1998)
6. U.S. Pat. No. 6,611,282 B1 to Trubko, et at
7. www.FLIR.COM/US.
8. R. Siegel, J. Howell, "Thermal radiation heat transfer", McGraw-Hill, 1980.
9. D. J. Hudson, "Statistics, Lectures on Elementary Statistics and Probability", Geneva, 1964.
10. T. Wu, "R2V Conversion: Why and How?", GeoInformatics, 6, Vol. 3, 2000, pp. 28-31.
11. D. Hearn, M. Baker, "Computer Graphics", Sec. 5-8, Prentice Hall, 1997.
12. K. Symon, "Mechanics", Adison-Wesley, 1971.
13. C. L. Farrar, D. W. Leeming, "Military Ballistics", Elsevier Science Ltd; 1983.

What is claimed is:
1. A projectile tracking device comprising:
   detector apparatus for converting into electronic form images in at least two infrared wavebands;

optics for projecting onto the detector apparatus an image in the at least two infrared wavebands of a scene across which a projectile passes;

first logic operative to obtain from the images in electronic form apparent brightnesses of the projectile at the optics in at least two infrared wavebands;

second logic operative to estimate the speed of the projectile from the ratio of the two measured apparent brightnesses;

third logic operative to obtain from the images in electronic form an azimuth of the projectile from the optics at successive times; and fourth logic operative to estimate the direction of the trajectory of the projectile and the distance to the trajectory in an azimuth plane including a location of the detector apparatus from the measured azimuths in combination with the ratio between the measured apparent brightnesses;

wherein at least some of at least one of said first, second, third, and fourth logic comprises a computer connected to receive image data from the detector apparatus and programmed to estimate parameters of the projectile trajectory using at least two of:

a method comprising measuring the azimuth of the projectile from the optics at successive times, and estimating the direction of the trajectory and the distance to the trajectory of the projectile from the measured azimuths in combination with the ratios between the measured apparent brightnesses;

a method wherein a perpendicular from the optics to the projectile trajectory and hence the direction of the projectile trajectory are estimated by locating the point with zero value of the second derivative with respect to time of the direction to the projectile, further combining the estimated projectile speed with the projectile trajectory direction for calculating distances from the optics to the projectile; and a method further comprising measuring the direction of the projectile from the optics at successive times, and estimating the trajectory of the projectile and the distance to the trajectory from the measured directions in combination with the estimated speed;

and to provide a final estimate using a comparison of estimates from at least two said methods of estimating parameters.

2. The tracking device of claim 1, wherein the detector apparatus comprises two photosensitive detector arrays, one for each of the at least two infrared wavebands, common objective optics, and a frequency-selective beam-splitter to direct light of each waveband to an appropriate one of the detector arrays.

3. The tracking device of claim 1, wherein the computer is further programmed to estimate parameters of the projectile trajectory using at least one of:

a method comprising measuring the azimuth of the projectile from the optics at successive times, and estimating the direction of the trajectory of the projectile from the measured azimuths in combination with the ratios between the measured apparent brightnesses;

a method wherein a perpendicular from the optics to the projectile trajectory and hence the direction of the projectile trajectory are estimated by locating the point with zero value of the second derivative with respect to time of the direction to the projectile, further combining the estimated projectile speed with the projectile trajectory direction for calculating distances from the optics to the projectile; and a method further comprising measuring the direction of the projectile from the optics at successive times, and estimating the trajectory of the projectile from the measured directions in combination with the estimated speed.

4. The tracking device of claim 1, wherein the computer is programmed to estimate the speed by estimating the temperature of the projectile from the ratio of the two measured apparent brightnesses and estimating the speed from the estimated temperature.

5. The tracking device of claim 1, wherein the computer is programmed to combine the estimated projectile speed with the estimated projectile trajectory direction for calculating distances from the optics to the projectile.

6. The tracking device of claim 1, wherein the computer is programmed to estimate a perpendicular from the optics to the projectile trajectory and hence the direction of the projectile trajectory by locating the point with zero value of the second derivative with respect to time of the direction from the optics to the projectile.

7. The tracking device of claim 1, wherein the computer is programmed to choose based on atmospheric conditions between projectile trajectory parameters calculated with at least two of:

a method comprising measuring the azimuth of the projectile from the optics at successive times, and estimating the direction of the trajectory of the projectile from the measured azimuths in combination with the ratios between the measured apparent brightnesses;

a method comprising estimating a perpendicular from the optics to the projectile trajectory and hence the direction of the projectile trajectory by locating the point with zero value of the second derivative with respect to time of the direction to the projectile, further combining the estimated projectile speed with the projectile trajectory direction for calculating distances from the optics to the projectile; and a method further comprising measuring the direction of the projectile from the optics at successive times, and estimating the trajectory of the projectile from the measured directions in combination with the estimated speed.

8. The tracking device of claim 1, wherein the computer is programmed to estimate the size of the projectile from the calculated trajectory and at least one measured apparent brightness.

9. The tracking device of claim 8, wherein the computer is programmed to:

determine a distance from the optics to the projectile using the calculated trajectory;

calculate an absolute brightness from the measured apparent brightness in at least one waveband and the determined distance to the projectile; and calculate the estimated size from the calculated absolute brightness and the estimated temperature.

10. The tracking device of claim 1, wherein the computer is programmed to estimate at least one of an origin of the projectile and a hit point of the projectile by extending an observable part of the trajectory and to superimpose the extended trajectory with a local terrain map.

11. A computer comprising a non-transitory computer readable medium encoded with a computer program to carry out a method comprising:

measuring apparent brightnesses of a projectile at an observing location in at least two infrared wavebands;

estimating a speed of the projectile from the ratio of the two measured apparent brightnesses;

measuring an azimuth of the projectile from the observing location at successive times; and estimating the direction of the trajectory of the projectile from the measured azimuths in combination with the ratios between the measured apparent brightnesses using at least two of:

a method comprising measuring the azimuth of the projectile from the optics at successive times, and estimating the direction of the trajectory and the distance to the trajectory of the projectile from the measured azimuths in combination with the ratios between the measured apparent brightnesses;

a method wherein a perpendicular from the optics to the projectile trajectory and hence the direction of the projectile trajectory are estimated by locating the point with zero value of the second derivative with respect to time of the direction to the projectile, further combining the estimated projectile speed with the projectile trajectory direction for calculating distances from the optics to the projectile; and a method further comprising measuring the direction of the projectile from the optics at successive times, and estimating the trajectory of the projectile and the distance to the trajectory from the measured directions in combination with the estimated speed;

and to provide a final estimate using a comparison of estimates from at least two said methods of estimating parameters.

12. A non-transitory computer readable storage medium encoded with a computer program that will cause a processor of a suitable general purpose computer to carry out a method comprising:

measuring apparent brightnesses of a projectile at an observing location in at least two infrared wavebands;

estimating the speed of the projectile from the ratio of the two measured apparent brightnesses;

measuring an azimuth of the projectile from the observing location at successive times; and estimating the direction of the trajectory of the projectile from the measured azimuths in combination with the ratios between the measured apparent brightnesses using at least two of:

a method comprising measuring the azimuth of the projectile from the optics at successive times, and estimating the direction of the trajectory and the distance to the trajectory of the projectile from the measured azimuths in combination with the ratios between the measured apparent brightnesses;

a method wherein a perpendicular from the optics to the projectile trajectory and hence the direction of the projectile trajectory are estimated by locating the point with zero value of the second derivative with respect to time of the direction to the projectile, further combining the estimated projectile speed with the projectile trajectory direction for calculating distances from the optics to the projectile; and a method further comprising measuring the direction of the projectile from the optics at successive times, and estimating the trajectory of the projectile and the distance to the trajectory from the measured directions in combination with the estimated speed;

and to provide a final estimate using a comparison of estimates from at least two said methods of estimating parameters.

13. A method of tracking a projectile in air, comprising:

using optics to project onto a detector apparatus an image in at least two infrared wavebands of a scene across which a projectile passes;

using the detector apparatus to convert into electronic form images in said at least two infrared wavebands;

using first logic to measure apparent brightnesses of the projectile at an observing location in said at least two infrared wavebands;

using second logic to estimate the speed of the projectile from the ratio of the two measured apparent brightnesses;

using third logic to measure an azimuth of the projectile from the observing location at successive times; and using fourth logic to estimate the direction of the trajectory of the projectile in an azimuth plane including a location of the optics from the measured azimuths in combination with the ratios between the measured apparent brightnesses using at least two of:

a method comprising measuring the azimuth of the projectile from the optics at successive times, and estimating the direction of the trajectory and the distance to the trajectory of the projectile from the measured azimuths in combination with the ratios between the measured apparent brightnesses;

a method wherein a perpendicular from the optics to the projectile trajectory and hence the direction of the projectile trajectory are estimated by locating the point with zero value of the second derivative with respect to time of the direction to the projectile, further combining the estimated projectile speed with the projectile trajectory direction for calculating distances from the optics to the projectile; and a method further comprising measuring the direction of the projectile from the optics at successive times, and estimating the trajectory of the projectile and the distance to the trajectory from the measured directions in combination with the estimated speed;

and to provide a final estimate using a comparison of estimates from at least two said methods of estimating parameters.

14. The method of claim 13, further comprising combining the estimated projectile speed with the estimated projectile trajectory direction for calculating distances from the observing location to the projectile.

15. The method of claim 13, wherein a perpendicular from the observing location to the projectile trajectory and hence the direction of the projectile trajectory are estimated by locating the point with zero value of the second derivative with respect to time of the direction to the projectile.

16. The method of claim 13, comprising choosing based on atmospheric conditions between projectile trajectory parameters calculated with said at least two methods.

17. The method of claim 13, further comprising estimating the size of the projectile from the calculated trajectory and at least one measured apparent brightness.

* * * * *